(12) United States Patent
Dixon et al.

(10) Patent No.: US 11,015,560 B2
(45) Date of Patent: May 25, 2021

(54) MULTI-FUNCTION ENGINE CONTROL AND INPUT SYSTEM

(71) Applicant: Walbro LLC, Tucson, AZ (US)

(72) Inventors: Andreas D. Dixon, Cass City, MI (US); Justin T. Dolane, Cass City, MI (US); Sean M. Murphy, Dexter, MI (US); Duried F. Rabban, Henderson, NV (US); Bradley J. Roche, Millington, MI (US); Elizabeth M. VanSipe, Caro, MI (US)

(73) Assignee: WALBRO LLC, Tucson, AZ (US)

( * ) Notice: Subject to any disclaimer, the term of this patent is extended or adjusted under 35 U.S.C. 154(b) by 0 days.

(21) Appl. No.: 16/652,907

(22) PCT Filed: Oct. 2, 2018

(86) PCT No.: PCT/US2018/053902
§ 371 (c)(1),
(2) Date: Apr. 1, 2020

(87) PCT Pub. No.: WO2019/070662
PCT Pub. Date: Apr. 11, 2019

(65) Prior Publication Data
US 2020/0318553 A1 Oct. 8, 2020

Related U.S. Application Data

(60) Provisional application No. 62/566,599, filed on Oct. 2, 2017.

(51) Int. Cl.
*F02N 11/08* (2006.01)
*B60K 35/00* (2006.01)
(Continued)

(52) U.S. Cl.
CPC .......... *F02N 11/0807* (2013.01); *B60K 35/00* (2013.01); *B60K 37/06* (2013.01);
(Continued)

(58) Field of Classification Search
CPC ... F02N 11/0807; F02N 11/101; B60K 35/00; B60K 37/06; B60N 2/002;
(Continued)

(56) References Cited

U.S. PATENT DOCUMENTS 2,446,711 A 8/1948 Mallory
7,546,836 B2 6/2009 Andersson et al.
(Continued)

FOREIGN PATENT DOCUMENTS

CN 102662388 A 9/2012
CN 202923595 U 5/2013
WO WO2016068185 A1 5/2016

OTHER PUBLICATIONS

Written Opinion & International Search Report for PCT/US2018/053902 dated Dec. 20, 2018, 10 pages.

*Primary Examiner* — Mahmoud Gimie
(74) *Attorney, Agent, or Firm* — Reising Ethington P.C.

(57) ABSTRACT

An engine control and input system for a device having a tool driven by an engine, includes an input and control module having one or more inputs and a controller responsive to actuation of the inputs to permit user control of at least one engine operating parameter by user actuation of the inputs. The system may include a touch screen display that displays icons to the user relating to the inputs and the at least one engine operating parameter, and wherein the touch screen display is responsive to the user selecting one of the inputs by touching an associated one of the icons provided by the display. At least one of the inputs may relate to one or more of changing engine speed, starting the engine, (Continued)

causing the engine to drive the tool, turning on a light, actuating a heater or warmer or stopping engine operation.

21 Claims, 16 Drawing Sheets

(51) Int. Cl.
| | |
|---|---|
| B60W 30/18 | (2012.01) |
| B60N 2/00 | (2006.01) |
| F02D 29/00 | (2006.01) |
| F02D 41/00 | (2006.01) |
| F02D 41/06 | (2006.01) |
| F02N 11/10 | (2006.01) |
| G05B 15/02 | (2006.01) |
| B60K 37/06 | (2006.01) |
| F02D 9/02 | (2006.01) |
| F02D 9/10 | (2006.01) |

(52) U.S. Cl.
CPC ....... *B60N 2/002* (2013.01); *B60W 30/18018* (2013.01); *F02D 9/02* (2013.01); *F02D 9/1065* (2013.01); *F02D 29/00* (2013.01); *F02D 41/0002* (2013.01); *F02D 41/064* (2013.01); *F02N 11/101* (2013.01); *G05B 15/02* (2013.01); *B60K 2370/152* (2019.05); *F02D 2200/021* (2013.01); *F02D 2200/101* (2013.01); *F02D 2200/60* (2013.01); *F02D 2200/602* (2013.01); *F02D 2400/14* (2013.01); *F02N 2200/08* (2013.01); *F02N 2200/0803* (2013.01)

(58) Field of Classification Search
CPC .. B60W 30/18018; F02D 9/02; F02D 9/1065; F02D 29/00; F02D 41/0002; F02D 41/064; G05B 15/02
USPC .......................................................... 701/102
See application file for complete search history.

(56) References Cited

U.S. PATENT DOCUMENTS

| | | | |
|---|---|---|---|
| 2006/0046650 | A1 | 3/2006 | Kohli et al. |
| 2011/0082619 | A1 | 4/2011 | Small et al. |
| 2012/0306637 | A1* | 12/2012 | McGough .............. B60K 37/06 340/439 |
| 2013/0289832 | A1* | 10/2013 | Pirotais .................. G05D 1/021 701/50 |
| 2015/0025753 | A1* | 1/2015 | Mori ...................... F02D 31/001 701/50 |
| 2015/0315982 | A1 | 11/2015 | Koenen et al. |
| 2017/0089274 | A1* | 3/2017 | Kolhouse ............ F02D 41/0002 |
| 2017/0197625 | A1* | 7/2017 | Omran .................. B60K 17/28 |
| 2017/0198809 | A1* | 7/2017 | Omran ................ F16H 61/0204 |
| 2017/0231148 | A1* | 8/2017 | Miwa .................. B05B 13/005 239/164 |
| 2018/0210440 | A1* | 7/2018 | Matsuzaki ........... G05D 1/0022 |
| 2018/0282976 | A1* | 10/2018 | Hasegawa .............. B60K 37/06 |
| 2018/0354364 | A1* | 12/2018 | Hackfort ................ G06F 9/451 |

* cited by examiner

MULTI-FUNCTION ENGINE CONTROL AND INPUT SYSTEM

REFERENCE TO RELATED APPLICATIONS

This application claims the benefit of U.S. Provisional Application Ser. No. 62/566,599 filed on Oct. 2, 2017, the entire contents of which is incorporated herein by reference in its entirety.

TECHNICAL FIELD

The present disclosure relates generally to an engine control and input system.

BACKGROUND

Devices that include small engines, such as lawnmowers, snow throwers, lawn and garden tractors and the like often have several switches, a key switch, a throttle lever, a brake, sometimes a gear selector/shifter to shift among various transmission gears that are separately actuated to control engine operation. The manual interface provides little information to a user and requires significant user knowledge to proficiently control the engine and the tool (e.g. lawnmower blade, snow throwing implement, tractor implement) and movement of the device. Further, the controls are manually manipulated and a user may have to continually adjust the throttle to obtain a desired engine speed or smooth performance, change the throttle when the tool is driven, slow the engine if the engine temperature or engine oil temperature becomes too high, and otherwise maintain control over the various engine operating parameters manually.

SUMMARY

In at least some implementations, an engine control and input system for a device having a tool driven by an engine, includes an input and control module having one or more inputs and a controller responsive to actuation of the inputs to permit user control of at least one engine operating parameter by user actuation of the inputs. The system may include a touch screen display that displays icons to the user relating to the inputs and the at least one engine operating parameter, and wherein the touch screen display is responsive to the user selecting one of the inputs by touching an associated one of the icons provided by the display. At least one of the one or more inputs may relate to one or more of changing engine speed, starting the engine, causing the engine to drive the tool, turning on a light, actuating a heater or warmer or stopping engine operation. In this way, the touch screen interface may permit user control of the various features of the device, engine and/or tool driven by the engine. The controller may command the display to show one or more of throttle position, engine speed, engine temperature, engine hours, air temperature, oil pressure, oil temperature and at least one fault condition or warning message to the user. Thus, the display may provide information to the user as well as provide and enable user inputs as noted above.

The display may include touch sensitive areas that permit a user to select from different options each associated with a separate one of the touch sensitive areas. That is, the display can include separate, discrete sensor areas or buttons, or one sensor array with different areas corresponding to different inputs to provide the functionality of many different inputs with one touch screen. At least one touch sensitive area may be used to provide two different options to a user with a first option available to permit initial starting of the engine and a second option available after the engine has been started. That is, the same area or portion of the touchscreen, or the same button or sensor, may be used to provide different functions at different times. For example, a button or switch used to start the engine may be used for a different function after the engine has been started, such as to permit reverse operation of the device, as the ability to start the engine is no longer needed. By way of another example, the first option may include an input via which at least part of an access code may be entered, wherein entry of a code other than the access code causes the controller to prevent starting of the engine and wherein the controller permits starting of the engine upon entry of the access code, and the second option includes an input via which an engine operating condition can be modified (e.g. a start button by which the engine may be started only after the access code has been entered).

The system may also include a switch having a first state and a second state, and wherein the controller is responsive to the state of the switch to prevent operation of at least one of the one or more inputs if the switch is in the first state and to allow operation of at least one of the one or more inputs if the switch is in the second state. In this regard, the device may include a seat in which the user sits when operating the device and/or a brake actuated by the user to slow or stop the device or the engine. The switch may be associated with the seat so that the switch is in the first state when the user is not seated in the seat and the switch is in the second state when the user is seated in the seat. Thus, certain or all functions may be controlled as a function of whether the user is seated in the seat or not. For example, the system may prevent or inhibit a user from starting the engine, or actuating the tool or causing the engine to move the device unless the user is seated. In at least some implementations, the switch is associated with the brake so that the switch is in the first state when the brake is not applied and the switch is in the second state when the brake is applied. Certain or all user controlled functions may be controlled as a function of whether the brake is applied or not. For example, prior to starting the engine, application of the brake may be required to demonstrate that the user is in control of the device.

The system may include a power source, such as a battery, and operation of at least one input may be prevented by not providing power to the controller until the switch is in the second state. The controller may be coupled to the power source and the controller maintained in a low power mode until the switch is in the second state wherein the controller wakes up and enables at least one input for actuation. In this way, the system may consume a minimum amount of electrical power until the user is ready to use the device, as evidenced by a change of state of the switch.

The device may include two or more engine operating modes and the inputs may permit a user to select one of the engine operating modes. In at least some implementations, the engine operating modes include at least one of a lower speed engine operating mode, such as an economy mode that provides quieter performance and/or better fuel economy, and a higher speed engine operating mode that provides faster or better device performance, such as a faster speed of travel of the device and/or a faster operation of the tool driven by the engine. In at least some implementations, the engine operating modes include at least one of a more responsive engine operating mode and a less responsive engine operating mode, which may alter the acceleration of the engine and/or response of the engine to user inputs.

The system may include memory in which is stored engine operating parameters associated with the engine operating modes, and the controller may be coupled to or otherwise communicated with the memory and responsive to implement the engine operating parameters associated with a selected one of the engine operating modes. In this way, when a user selects a particular engine operating mode, the controller obtains information from the memory as to the desired or target parameters (for example, minimum and/or maximum engine speeds) and the controller provides control signals to implement the desired or target parameters during operation of the device. The parameters may provide for desired tool speed or power which may vary depending upon the user selected operating mode. For example, the tool speed or power may be lower in an economy or lower power mode than during a performance, sport or other higher speed mode.

The engine may include a fuel and air supply device having a throttle valve and an electrically actuated throttle control that changes the position of the throttle valve. The controller may be connected to the throttle control and one or more of the inputs may enable a user to change the throttle valve position via the controller and throttle control.

To facilitate use of the device, the system may include a Bluetooth module to permit wireless control of the module via a Bluetooth coupled device, such as a smart phone or the like. The Bluetooth module may be received in an enclosure having an opening through which the wireless signals between the Bluetooth module and the coupled device are more readily passed compared to other portions of the enclosure. This may help to focus the Bluetooth interaction and limit the interaction to a zone or direction to ensure the user is within a desired area prior to enabling Bluetooth control. The enclosure may be defined by a housing having an open side or by signal attenuating material (e.g. potting or other material within the enclosure) surrounding at least a portion of an antenna of the Bluetooth module.

In at least some implementations, a device includes an engine including a throttle and an electronic throttle control that actuates the throttle and changes the engine speed, a tool driven by the engine, and an input and control module having one or more inputs and a controller. The controller may be coupled to the throttle control and is responsive to actuation of the inputs to permit user control of at least one engine operating parameter by user actuation of the inputs.

The system may also include memory with which the controller is communicated and the memory may include information relating to two or more engine operating modes, and the inputs permit a user to select one of the engine operating modes. In at least some implementations, the engine operating modes include at least one of a lower speed engine operating mode and a higher speed engine operating mode, and the memory includes information relating to control of the throttle control for both operating modes. The engine operating modes may include at least one of a more responsive engine operating mode and a less responsive engine operating mode, and the memory may include information relating to control of the throttle control for both operating modes. The information relating to control of the throttle control may include information relating to a desired engine speed for multiple operating conditions of both operating modes. In this way, a user can simply select a desired operating mode and the controller may automatically control the engine throttle to provide a desired engine speed, or maintain the engine within desired upper and lower threshold for different operating conditions, such as starting, warm-up and engine idle, high speed engine operation, high load engine operation, operation with the tool driven by the engine (e.g. a first condition of engine operation) and with the tool not driven by the ending (a second condition of engine operation), and the like.

The system may include an engine controller and the engine controller may provide a signal to the input and control module controller that is indicative of engine speed and/or other engine operation conditions or parameters. The input and control module controller may then control the throttle control as a function of the engine speed compared to a desired engine speed for the selected engine operating mode. Thus, the input and control module controller can make adjustments to the engine throttle to provide a desired engine output (e.g. device speed or tool speed, etc). For example, in at least some implementations, the controller actuates the throttle control to reduce engine speed prior to changing from the first condition (tool not driven by the engine) to the second condition (tool is driven by the engine) to reduce a torque impulse when the tool is initially driven by the engine. Further, the desired engine speed may be different for the first condition than for the second condition. In the example of a tractor or riding lawnmower, the device travel speed may be greater when the tool is not driven than when the tool is driven to permit greater device/vehicle speed when the tool is not being used.

The various features and components noted above may be used in various combinations, at least to the extent they are not mutually exclusive. Some of the implementations and combinations are set forth above and below, and others will be readily apparent from this disclosure.

BRIEF DESCRIPTION OF THE DRAWINGS

The following detailed description of certain embodiments and best mode will be set forth with reference to the accompanying drawings, in which.

DETAILED DESCRIPTION

Figure 1:
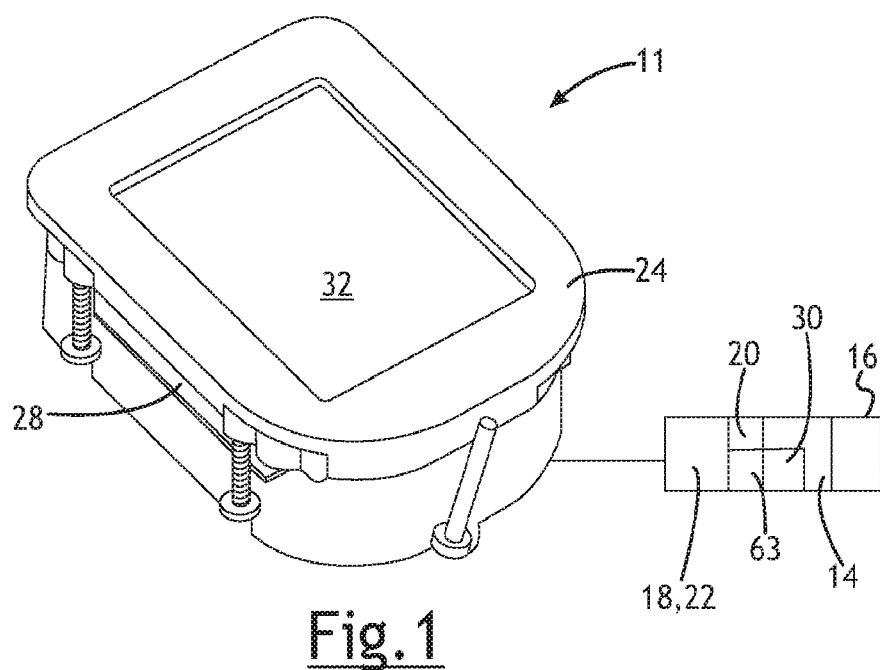
FIG. 1 is a perspective view of an input and control module including a LCD touchscreen.
Figure 2:
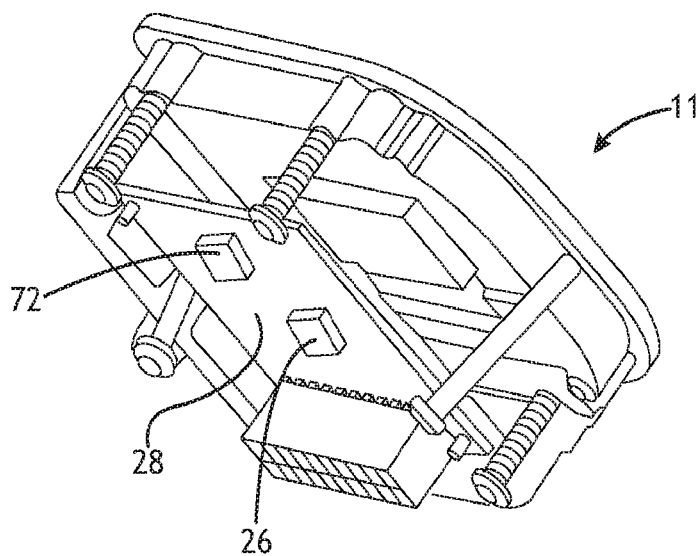
FIG. 2 is a perspective view of the module with a lower portion of the housing shown as transparent to show certain internal components.
Figure 3:
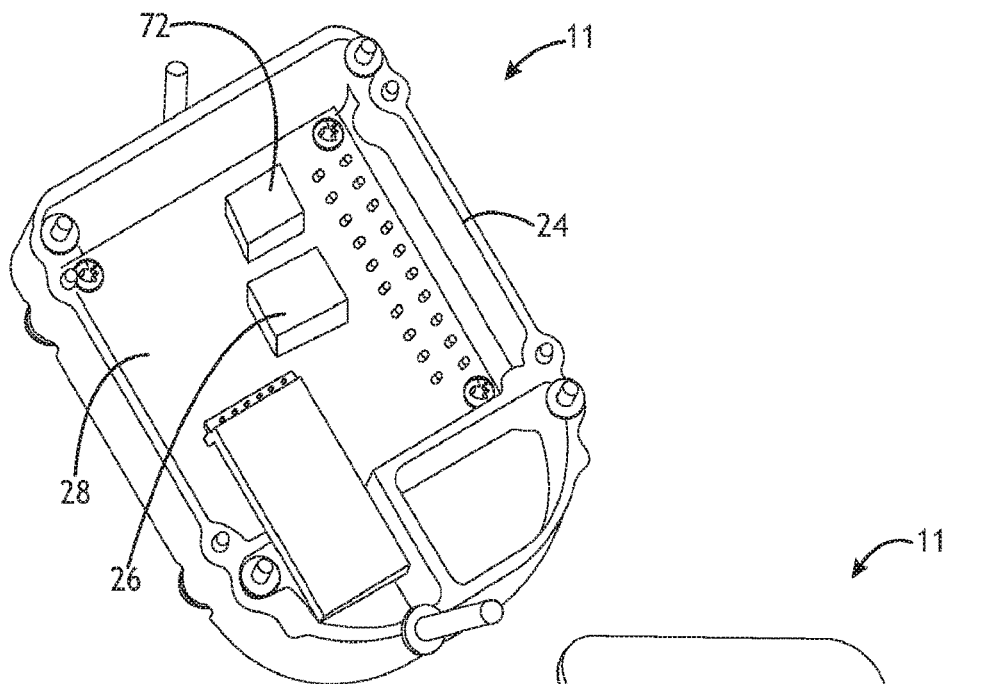
FIG. 3 is a perspective view of the module similar to FIG. 2 but from a different angle.
Figure 4:
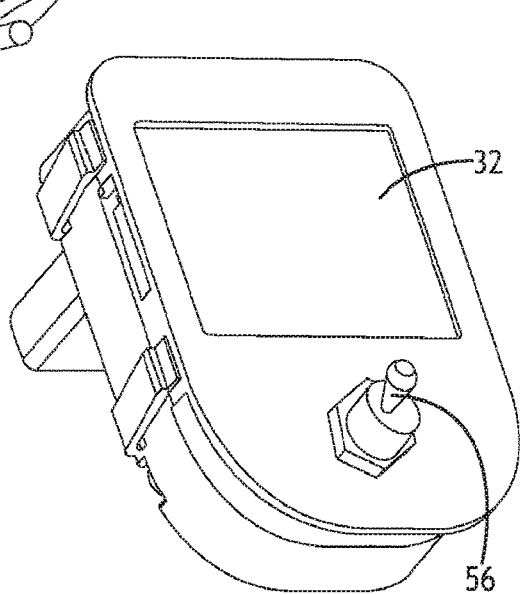
FIG. 4 is a perspective view of an input and control module (called "MEM") including a display screen and a switch, which may be used as a system power switch or for another purpose.
Figure 5:
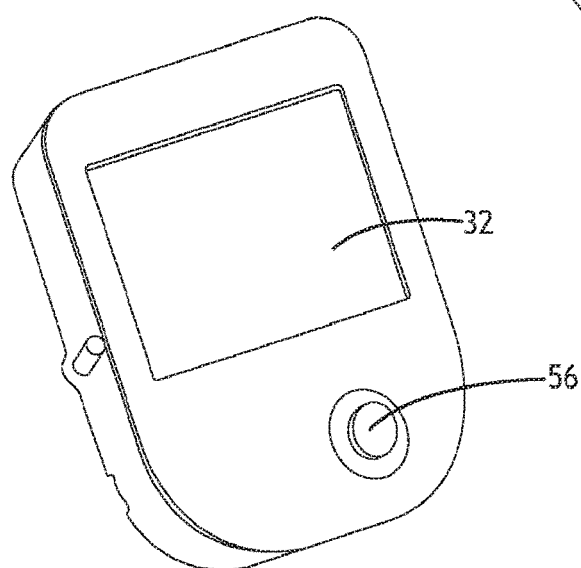
FIG. 5 is a perspective view of an input and control module (called "MEM") including a display screen and a switch, which may be used as a system power switch or for another purpose

Referring in more detail to the drawings, FIGS. 1-9 and 16-34 illustrate engine control and user input systems 10 including a multi-function module 11 having a user interface including one or more inputs 12 that may be in the form of switches, dials, sliders, sensors or sensor areas (e.g. responsive to touch, gesture or capacitance) that may be actuated by a user to control operation of an engine 14 and/or tool 16 driven by the engine. Example devices having an engine 14 and tool 16 that may be controlled at least in part by the system described herein include, but are not limited to, riding lawnmowers, tractors, utility vehicles and the like.

The engine 14 may include an ignition system 18 having a spark plug 20 or igniter, an ignition circuit, such as is disclosed in U.S. Pat. No. 7,546,836, that drives the spark plug 20 and includes a controller 22 which may itself include a processor of any desired type. The ignition system 18 may receive power from a battery, or it may be a magneto ignition system (inductive or capacitive). The controller 22 may be effective to control the timing of the ignition events in the engine 14, may monitor engine speed and/or temperature among other things. Certain devices may have safety features that, for example, prevent the engine 14 from being started, limit engine speed in certain circumstances or prevent the tool 16 from being driven unless certain conditions have been satisfied.

The control and input system 10 may include the module 11 that may have a housing 24 on which is mounted or carried one or more inputs 12 that may be actuated by an operator of the device to control at least one parameter relating to operation of the engine 14 and/or tool 16. Non-limiting examples include actuating a starting device, controlling engine speed (e.g. between idle and faster speeds), turning on headlights or other lights, actuating a tool driven by the engine (e.g. a tool coupled to a power take off shaft or coupling that is driven by the engine). The control and input system 10 may also include a controller 26, such as a processor and accompanying circuitry (e.g. on a printed circuit board 28 carried within the housing 24) that controls at least certain aspects of the engine operation. The control and input system controller 26 may communicate with the engine controller 22 to, for example, relay user selections to the engine controller (e.g. with regard to a desired engine speed or tool operating mode). The control and input system 10 may communicate directly with a fuel and air supply device 30 (e.g. a carburetor or throttle body including a throttle valve and a fuel injector or fuel control valve) of the engine 14.

The control and input system 10 may: manage safeties devices or strategies; manage inputs from the operator to control engine speed (e.g. provide throttle control) and, in some implementations, make a physical key unnecessary; control the starter, possibly using feedback from the engine controller or otherwise, such as engine speed, temperature, time or number of revolutions since the engine was started; manage a reverse override mode on lawnmowers or other devices (in this mode, PTO engagement may be permitted in reverse gear whereas in normal operation it would not); manage electrical outputs for ancillary devices on the device (e.g. headlights, seat warmers, steering wheel or hand grip warmers); manage electrical control of an Electric Power Take-Off (EPTO); and/or utilize a touch-screen LCD control interface for the operator to specify at least some operating conditions or control at least some features of the device.

In at least some implementations, the control and input system 10 may: provide options for and accept user inputs for desired engine speed or load condition; accept user input to start and shut-off the engine; accept user input to turn on or off PTO attachments, such as mowing blades, snowblower auger, etc; accept user input to turn on/off auxiliary application features like headlights, seat warmers, etc; display information to the user (throttle, engine speed, engine temperature, engine hours, air temperature, oil pressure, oil temperature, etc); drive outputs such as the engine starter, the power to a fuel injector or fuel injection system, relays to power external devices, headlights, warmers, etc); and/or manage and implement safety features.

With this functionality, one or more of the following may be eliminated and replaced with similar functions implemented by the control and input system: throttle lever or other throttle actuator; governor control lever assembly; ignition key switch; engine hour meter; electric PTO switch; headlight switch; seat and/or hand warmer switch; safety feature control module; diagnostics interface (e.g. provides data for service of the device or warranty information); and other switches or controllers.

The control and input system 10 may provide the following functions: command set points for engine speed to an electronic throttle controller of the engine control module; command PTO engage/disengage events; feed forward information about application conditions to the engine control module; controls auxiliary application features such as headlights and warmers; processes and manages safety features ad devices such as seat switch (e.g. may require seat to be occupied to start engine), brake switch (e.g. may require brake to be applied to start engine or shift into reverse), PTO switch (to engage/disengage PTO), reverse switch (to enable shifting to reverse gear), etc; allows for advanced diagnostics compared to existing applications (easy interface point for device usage data, storage of fault indicators, sensor information and the like); allows for elimination of an expensive diagnostic interface for dealer service (module is available for user input and so it is easy to access and can be made so that data can be easily obtained from the module as compared to controllers mounted on or near the engine, for example, under an engine cowling or housing); allows user to view information such as engine speed, fuel economy indicator, current state of safeties, fault conditions, hour meter, service information (e.g. fluid levels, fluid life remaining (i.e. before fluid change is recommended)); eliminates components and suppliers to manage for device manufacturer (e.g. eliminates switches and things noted above); more effectively ties the engine to the application (e.g. permits enhanced control of engine and tool driven by the engine in accordance with operating conditions and user preferences/inputs); manages safety features and devices and engine together and does so more effectively than current solutions, with greater flexibility and intelligence; facilitates tight control of engine operating conditions to avoid user-generated conditions that may contribute to poor run quality or an otherwise unsatisfactory experience; creates a system that may be one-button control, more attractive to demographics that do not wish to or do not understand operation of chokes, starters, etc (takes guess work out of starting and operating application); allows for better feedback and notification to user about state of application (oil change interval, faults, etc).

In at least some implementations, the system 10 may include: a control and input module 11 which has or is communicated with a controller 26, and an LCD touch-screen interface 32 for receipt of user inputs and display of information. The module/controller 11/26: may use serial communication to communicate with and control the engine controller 22; can be integrated into a single enclosure or housing 24 that includes the LCD touch-screen 32; may have the ability to read engine speed both from an engine sensor (e.g. a VR sensor) and via the serial communication with the engine controller 22; may have multiple configurable inputs 12, allowing connection to existing switches/safety features on the device. The inputs/sensors 12 may be software configurable to be ground-sensing, voltage level sensing, or voltage threshold sensing or time captured signals. This allows one unit to work with many different switches, sensors, etc. The module/controller 11/26 can also utilize discrete specific input circuits, custom tailored to the device/tool being used. Among other things, this may allow measurement of external switches and sensors, such as safeties, oil pressure, temperature, ambient temperature, etc.

The module/controller 11/26 may include or be associated with suitable memory to store instructions, programs, software, data, look-up tables/maps and the like. The memory may be EEPROM and Flash. In at least some applications, the information stored may relate to, among other things, engine runtime (e.g. hours); fault code history; run time history (which may include time at various speed thresholds, among other things); engine serial number/identification; device serial number (i.e. identification information for the lawnmower, tractor, or other device).

The control and input system 10 communicates with the engine controller 22 the current engine speed set point to allow the user to set the speed that an electronic throttle control (e.g. electrically operated throttle valve actuator) and fuel injection system (i.e. fuel and air supply device 30) should attempt to maintain.

The control and input system 10 may be useful to provide/enable more complicated safety strategies to the engine controller 22 or other controller of the device, such as to: kill the engine when entering reverse with a manual PTO on without having entered the reverse override mode; kill the engine when pressing the off button on the module; disengage or turn off an EPTO when entering reverse while leaving the engine running.

The control and input system 10 may control power to the engine controller 22 and/or other controller of the device, and other electrically actuated components, such as fuel injection components (e.g. part of or defining the fuel and air supply device 30). This may be controlled based on when the engine 14 should be prepared to run. For example, when the user is in the seat, the engine controller 22 may be powered (e.g. seat switch actuated to detect when the user is in the seat). The control and input system 10 may also control power to auxiliary components such as headlights and warmers. And the system 10 can incorporate circuits to turn UART low-level communication to USB communication, removing the need for the dealer or service personnel to connect external devices to communicate to the device for service reasons.

Figure 6:
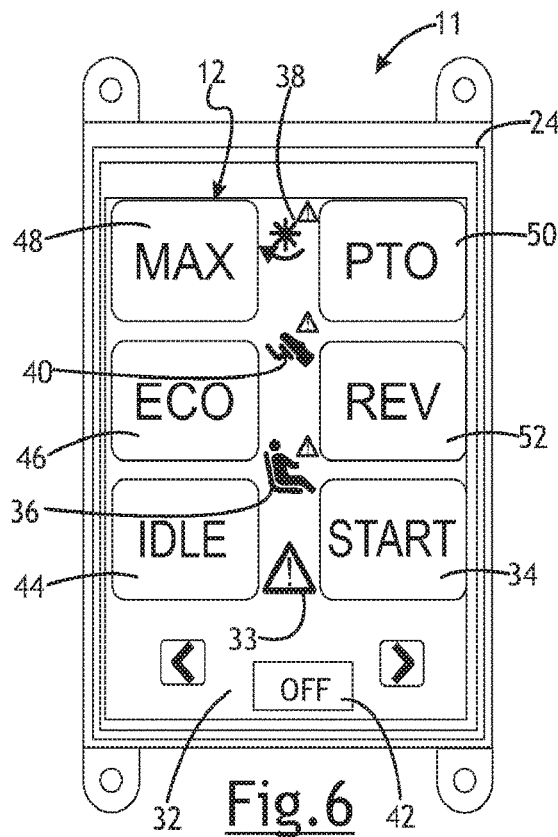
FIG. 6 is an example display of the module including separate inputs and icons or other information.
Figure 7:
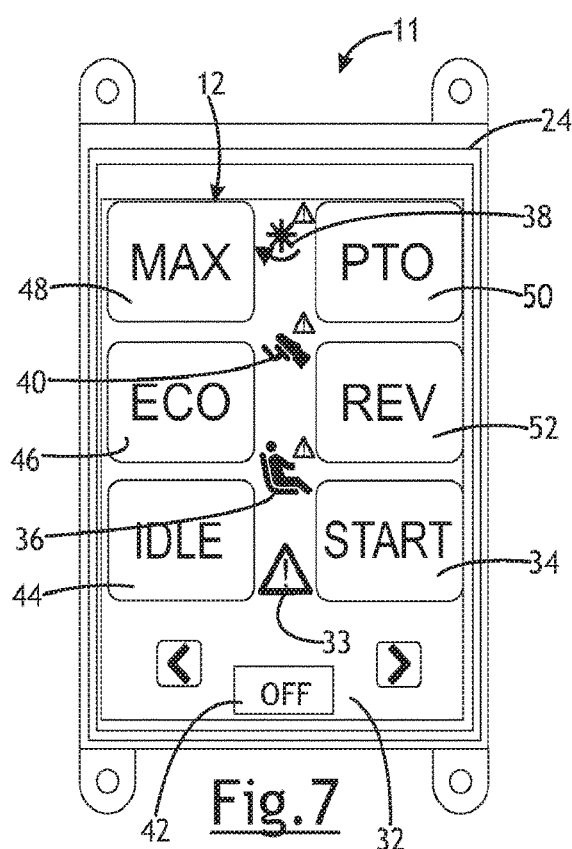
FIG. 7 is a view similar to FIG. 6.
Figure 8:
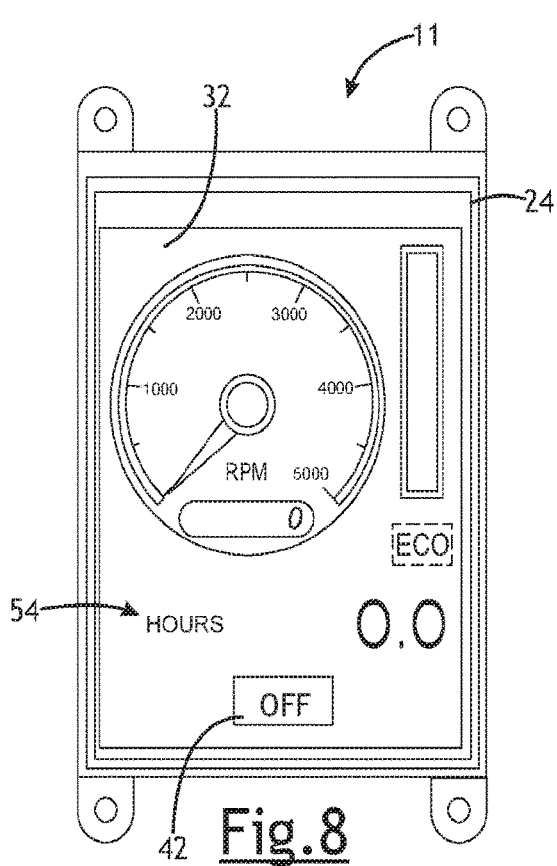
FIG. 8 is an example of another display screen showing a rpm gauge and other information.
Figure 9:
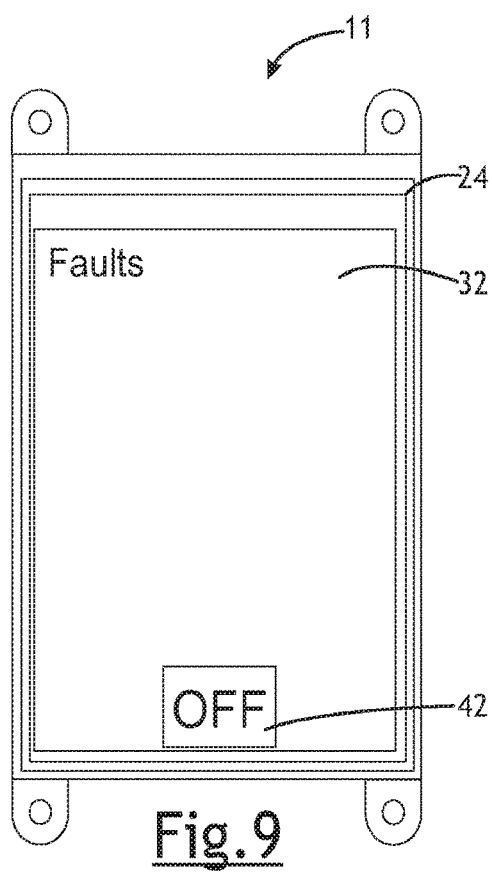
FIG. 9 is an example display screen that may show fault codes or other information.

A process for using the control and input system 10 may include: providing power to the control and input system, such as from a battery so that the control and input system is operable to engage and control other components. The controller may be in a low power consumption mode, like sleep mode, waiting for subsequent use of the device. In this way, all external devices may be off and without power to reduce the battery drain when the device is not in use. When use of the device is desired (e.g. as detected by a key turned to an on position, actuation of a brake, user sitting in a seat, etc), the control and input module may provide power from the battery to the engine controller and discrete components needed to wake from sleep. As shown in FIGS. 6 and 7, one or more user inputs or indicators (e.g. the LCD screen 32 or switches/dials) may be needed to permit starting of the engine and subsequent use of the device, and so the input(s) may be powered/enabled. With a system having an LCD or other display 32, a start button 34 may be displayed (an input that when actuated causes and engine starting sequence to occur) as well as any safeties that may prevent engine from running. Example safeties that may be used include a seat switch (represented by icon 36)—if the seat switch is not actuated or is otherwise in a state indicating the seat is empty, the system may prevent the engine from starting, a PTO switch (represented by icon 38) or feedback from EPTO that indicates that the PTO is engaged may prevent the engine from starting; a brake switch (icon 40) indicating that the brake is off or not engaged may prevent the engine from starting.

The user may command an engine start by pressing the start button 34 or switch, turning a key to the starting or on position, or the like. If the safety conditions are satisfied, the engine starting procedure may begin, assuming there are not fault conditions in the engine that would prevent the start procedure from occurring (e.g. too high of an engine or oil temperature or the like, may cause the system to prevent starting the engine). If engine starting is not initiated for any such reasons, one or more faults or other information may be displayed to inform the user why the engine start is not occurring (e.g a general fault icon/indicator 33). Before starting the engine, the controller 26 may determine if the engine speed is below a speed threshold for an attempted starting event (e.g. that the engine is not already running). In at least some implementations, if the engine starting conditions are satisfied, the control and input system 10 may highlight (e.g. activate an associated LED or other light) the start button 34, and may lock out other buttons except for perhaps an OFF button 42 (FIG. 9) by which the user may shutdown the control and input system and/or terminate engine operation after starting, if desired.

To initiate an engine start, the controller 26 may actuate a starter solenoid to engage an electric starter. The controller 26 may then detect or determine the engine speed and continue to drive the starter to start the engine 14. In at least some implementations, the starter may be driven until either the engine speed is greater than a start_rpm_threshold for a time greater than a start_rpm_debounce_time; or the starter is actuated for a maximum amount of time (which may be chosen to protect and avoid damage to the starter and associated components).

When it is determined that the engine 14 has started, the starter is deactuated. One or more user inputs 12 may be enabled and highlighted. For example, an IDLE button (icon 44), one or more other engine speed/load option buttons (like ECO mode (icon 46) and MAX modes (icon 48), allowing more economical device use or maximum performance use, respectively, or specific speed/rpm control options), a PTO actuation button (icon 50), a reverse override button (icon 52), and the like. Optionally, the controller 26 may require an engine warm-up period before the engine 14 is allowed to move beyond its initial start and warm-up speed or its idle speed, to ensure the engine is ready to operate at higher speeds and loads (e.g. to prevent the engine from stalling or running roughly if put under load when not adequately warmed-up and stable). If desired, the control and input system 10 may enable display to the user of certain data and information like engine speed and throttle position and any other indicators that may be requested from the engine controller.

User inputs may be used to determine desired engine speed/load set points, examples of which include: if user selects ECO mode (e.g. by actuating/pressing the ECO icon 46), the system sends an ECO command serially or via analog voltage level to the engine controller, this would move the target engine speed to a predetermined set point associated with ECO mode, set in the calibration of the engine controller. If the user selects MAX mode (e.g. by actuating/pressing the MAX icon 48), the system sends a MAX command serially or via analog voltage level to the engine controller, this would move target engine speed to a predetermined set point associated with MAX mode, set in the calibration of the engine controller. If the user selects IDLE mode (via icon 44), the system sends an IDLE command serially or via analog voltage level to the engine controller, this would move target speed to a predetermined set point associated with idle engine operation, set in the calibration of the engine controller. If the user selects a set speed, for example, 3,000 rpm, the system sends a command serially or via analog voltage level to the engine controller to move the target speed to a predetermined set point (likely 3,000 rpm), set in the calibration of the engine controller. The speed/power/load condition may also be variably adjusted rather than in discrete steps, for example, to increase or decrease from current state. When the user selects via software or other input to increase or decrease engine performance, a signal may be sent to proportionally or step-wise increase or decrease the engine speed/power, according to instructions or programs stored in or accessible by the engine controller.

Safety features/inputs may be used to determine if the above can be accomplished. For example, if the seat switch indicates that someone is in the seat, the inputs may be enabled. If the system detects that someone is not in the seat, but the brake is actuated, then the inputs may be enabled (in some systems). If the system detects that someone is not in the seat, and the brake is not engaged, the inputs may be disabled or ignored.

If the device includes an EPTO, if the user selects an input to actuate the EPTO, then the system may determine, for example, if the unit is in reverse and if someone is in the seat. If the unit is not in reverse and someone is determined to be in the seat, then the system may enable the EPTO to be actuated, and a light or other indicator may be actuated to display to the user that the EPTO is engaged.

Similar control strategy may be used with regard to the reverse override mode which enables the PTO to be operated while the device is in reverse gear. Without entering the reverse override mode (e.g. via icon 52), the device may be prevented from entering reverse gear while the EPTO is engaged, or the engine may be shutoff when reverse gear is selected. Among other things, this may prevent inadvertent usage of the tool driven by the engine while the device is going backwards/in reverse. In at least some implementations, if the PTO is engaged and user selects the reverse override mode, then the system may proceed as follows: a timer may be started (if the system permits reverse override only for a limited time), if the device (such as a tractor) enters reverse gear (which may be sensed, such as by a reverse gear switch input on the controller) and the timer indicates a time less than a rev_override_max_time, then the system may proceed in reverse override mode, else the system may turn off the EPTO or send a KILL command to the engine controller to terminate engine operation. Exiting reverse may terminate the reverse override mode which would require the reverse override mode to again be selected if subsequent reverse operation was desired by the user. Otherwise, the timer may permit re-entry into reverse override mode if reverse gear is again entered within a specified amount of time. This permits some forward and reverse adjustments of the vehicle without requiring a user to select reverse override mode for each reverse manipulation of the vehicle that occurs in close time proximity to entering reverse override mode. If the timer has expired (i.e. the max time for re-entry into reverse entry mode has expired) then the system may turn off the EPTO or send a KILL command to the engine controller to terminate engine operation.

If the user engages the PTO either via manual PTO (sensed by the controller via a PTO switch—e.g. which changes state when a PTO engagement lever is moved) or attempts to engage an EPTO (via input 50 of the system— e.g. a button/icon on the LCD) and the time is less than the rev_override_max_time then the system may proceed in reverse override mode, else the system may not engage the EPTO or with a manual PTO may send a KILL command to the engine controller to terminate engine operation.

The headlights may be turned on either when the engine is running (as confirmed by the controller) or for a limited duration when the engine is not running (e.g. to avoid unduly draining the battery). When the engine is shut off or the timer expires, the headlights may be automatically turned off by the controller. When the headlights are on, an indication, such as illumination of a light on the module, may be provided to the user.

The control and input system 10 may allow for multiple pages or screens of information and controls for user provided on the user interface 32, with buttons or switches allowing the user to navigate among the screens. In at least some implementations, the engine OFF button 42 may be provided on one or more and up to each screen when the engine is running so that option is readily available to the user. The information displayed may include engine hours (at 54 in FIG. 8), which may be recorded by measuring time that the engine speed is greater than or equal to a minimum engine running speed, which may be saved in a permanent or semi-permanent storage means, such as FLASH or EEPROM. Service interval information may be displayed and may be based on the following: oil change timing based on the engine running hours only; oil pressure indication (read into the control and input controller via analog or digital input to determine approximate oil pressure, as indicated by the oil pressure sensor); engine hours at specific engine speeds, weighted and binned to determine more specific oil change interval (example, more time at 3600 rpm would necessitate oil changes more often); engine hours at specific loads, determined via feedback with the engine controller, weighted and binned to determine more specific oil change interval (example, more time at 80% load would necessitate oil changes more often); engine hours at specific engine temperatures, determined via feedback with the engine controller, weighted and binned to determine more specific oil change interval (example, more time above 100 deg C. would necessitate oil changes more often, or more time below −10 deg C. would necessitate oil changes more often); engine hours at any combination of the above or other engine runtime parameters that can be pulled from the engine controller via serial communication that can be used to better understand actual engine usage and the appropriate service interval. Air filter cleaning or replacement timing may be based on any of the above noted for oil change, as well as other factors unique to air flow in the engine, for example, detection that the air fuel ratio is excessively rich for a certain length of time, which can indicate that air flow through the air filter is less than desired which indicates the filter is dirty or clogged and should be changed. The information displayed may also include engine parameters like oil pressure, oil temperature, ambient temperature, and the like.

Power may be provided to the control and input system 10 in any desired manner. In at least some implementations, the controller/system can be powered by a master or system power switch 56, shown as a toggle in FIG. 4 and a push button in FIG. 5, but any type of switch/interface/input may be used. This would allow total power-down of system by actuation of one switch 56. The user may have to actuate this switch 56 to an on position to turn on the system, which may improve long-term storage, as there would be no battery draw when the switch is off (e.g. in at least some implementations, the controller and other components would not be in sleep mode but would instead be off when the master switch is off).

The control and input module 11 may include multiple inputs 12 that permit a user to enter one or more codes to operate the device (e.g. start the engine, engage a PTO, etc) or accomplish other tasks (e.g. download data, reprogram or update software on the device, etc.). The ability to protect against unauthorized use of the device by requiring an access code may mean that a key or other unique implement is not needed to gain access to the control system and operate the device. This may mean that a costly key switch may be eliminated, while retaining the ability to lockout users that shouldn't use the equipment. This eliminates the hassle of losing or having to locate a key for the device, is more secure than leaving the key in the key switch (which many users do), retains the ability to limit all use or some use of the device based on access code(s), and allows a user to update/change the codes (compared to having to purchase a replacement key if a key is damaged or lost).

Figure 19:
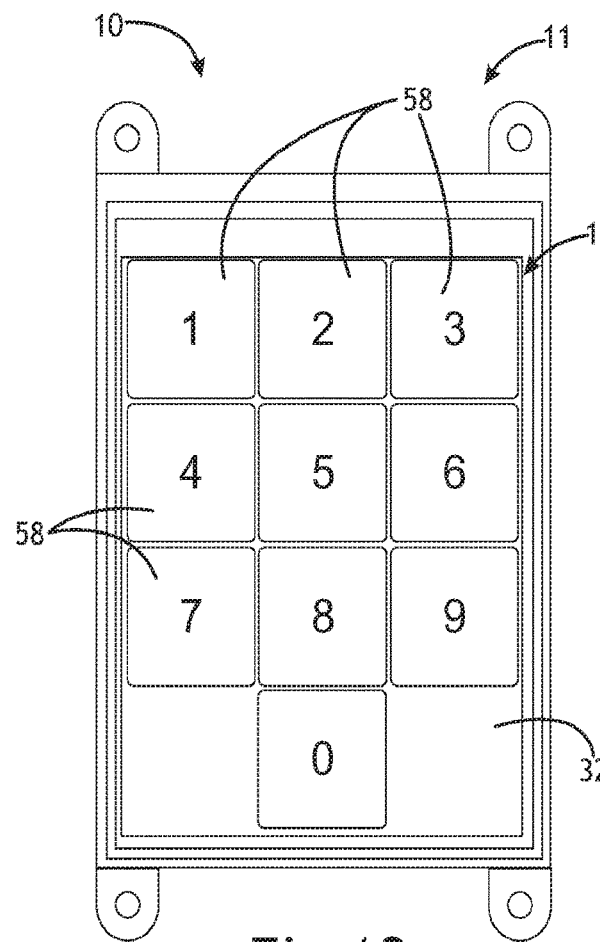
FIG. 19 is an example display showing a keypad having numbered inputs.
Figure 20:
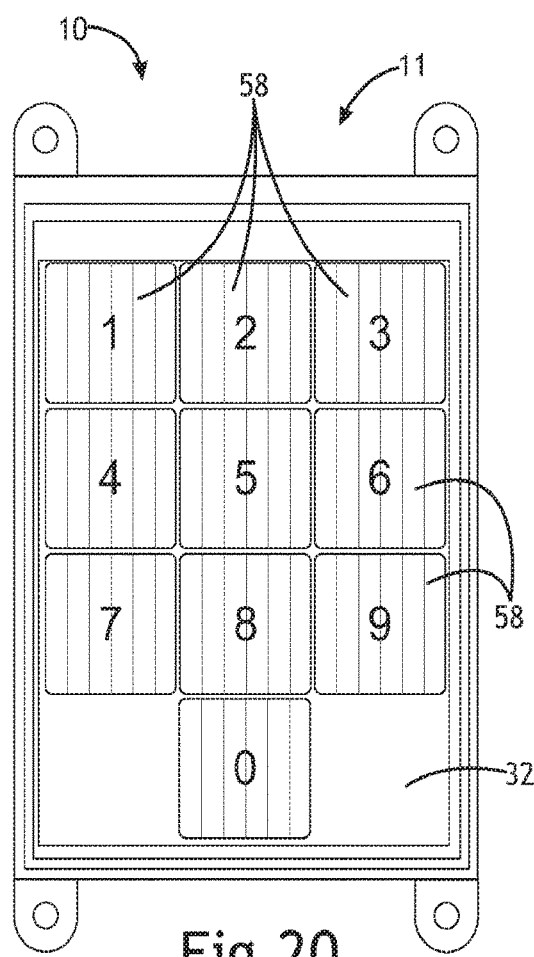
FIG. 20 is similar to FIG. 19 except the keypad is red indicating an improper code has been entered or other fault.
Figure 21:
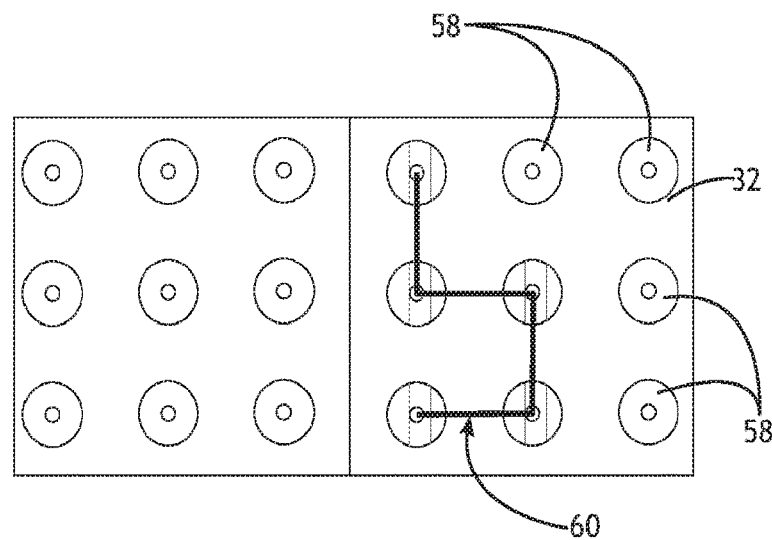
FIG. 21 is an example display showing an example of pattern-based code entry.
Figure 31:
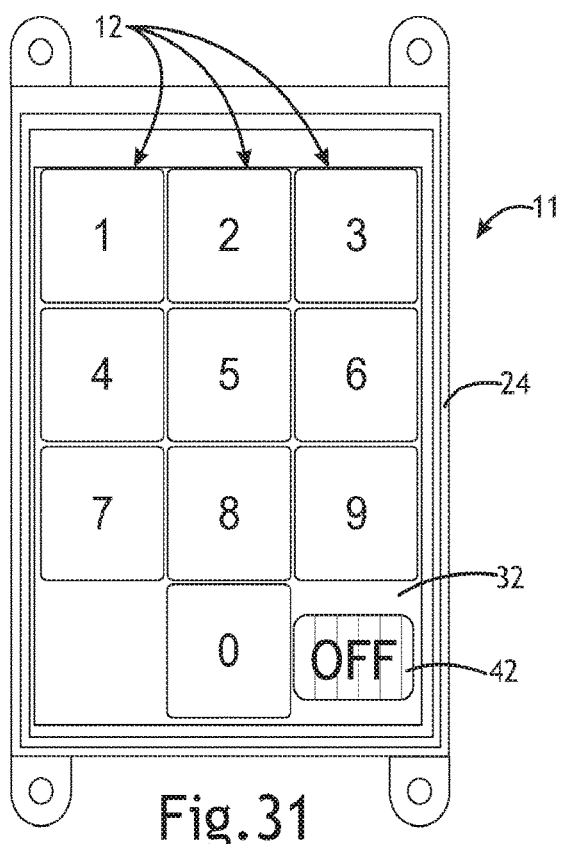
FIG. 31 is an example display showing a keypad having numbered inputs and an off button.
Figure 32:
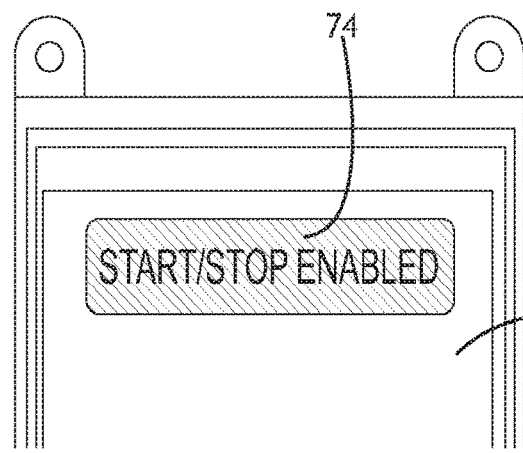
FIGS. 32 and 33 show portions of the display including information regarding start-stop mode status.
Figure 33:
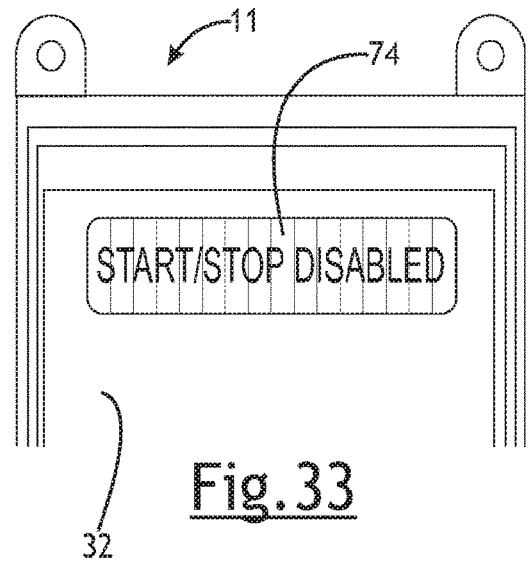

The system may include a touch screen interface 32 that has a plurality of inputs 12, which may be separate switches or sensors, or a single surface that is touch or pressure sensitive and responsive to and able to differentiate among inputs at different locations across the screen. Thus, separate inputs 12 may be sequentially actuated to input a code into the control and input module. The inputs may be numbered or lettered (e.g. on a keypad as shown in FIGS. 19, 20 and 31. The keypad may include discrete buttons 58 or a display of buttons on a LCD or other touch screen.) to facilitate users remembering and accurately entering the code(s). The code may instead comprise a pattern 60 traced on the screen, such as by a users finger (e.g. with a pressure sensitive or capacitive sensor arrangement). The pattern may intersect a plurality of discrete sensors in a particular order, or otherwise provide a discernible code entry, one example of which is shown in FIG. 21.

In use of such a system, the controller 26 may receive power from the battery to enable a code to be input by the user. The controller 36 may wake from sleep mode, but other components may be unpowered, at least until an access code is entered. In some applications, the controller 26 may be provided power upon the user satisfying an initial condition, such as by sitting on a seat or engaging a brake to change the state of a seat or brake switch. Upon actuation of the controller 26, the discrete keypad inputs 12 may be active and ready to receive a code, or a keypad or other inputs may be displayed on the LCD screen 32 (or the LCD screen may be ready for receipt of a pattern or the like). If the code 60 entered is correct, the remainder of the system may be powered, if not, an incorrect code signal may be provided to the user (e.g. flashing red lights, buzzing sound, or message displayed, as generally shown in FIG. 20). The start button 34 may be activated (if a discrete button is provided) or a start option may be displayed on the screen 32 for actuation by the user, and the keypad or other initial input options might no longer be displayed on the screen. In some implementations, if the engine 14 is shut off and the user remains in the seat, the keypad or other initial input option is not shown because the user is already approved/authenticated. In some implementations, if the user leaves the seat when the engine is off, a timer may be set and if the user returns to the seat before the timer expires, re-entry of the code is not required. If the timer has expired, then when the user returns to the seat, the keypad or initial input option is displayed and the user must re-enter the access code.

Figure 18:
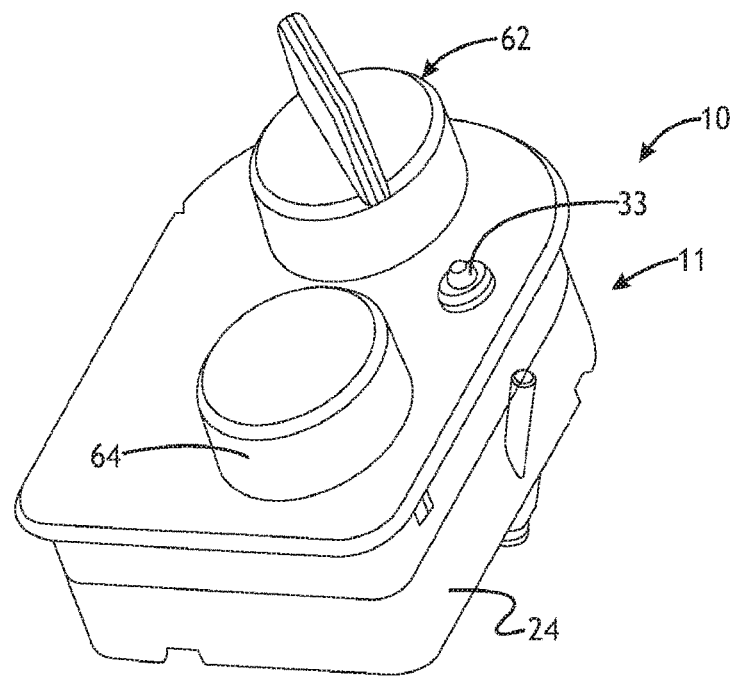
FIG. 18 is a perspective view of an input and control module including a key switch, a rotary knob and a LED.
Figure 22:
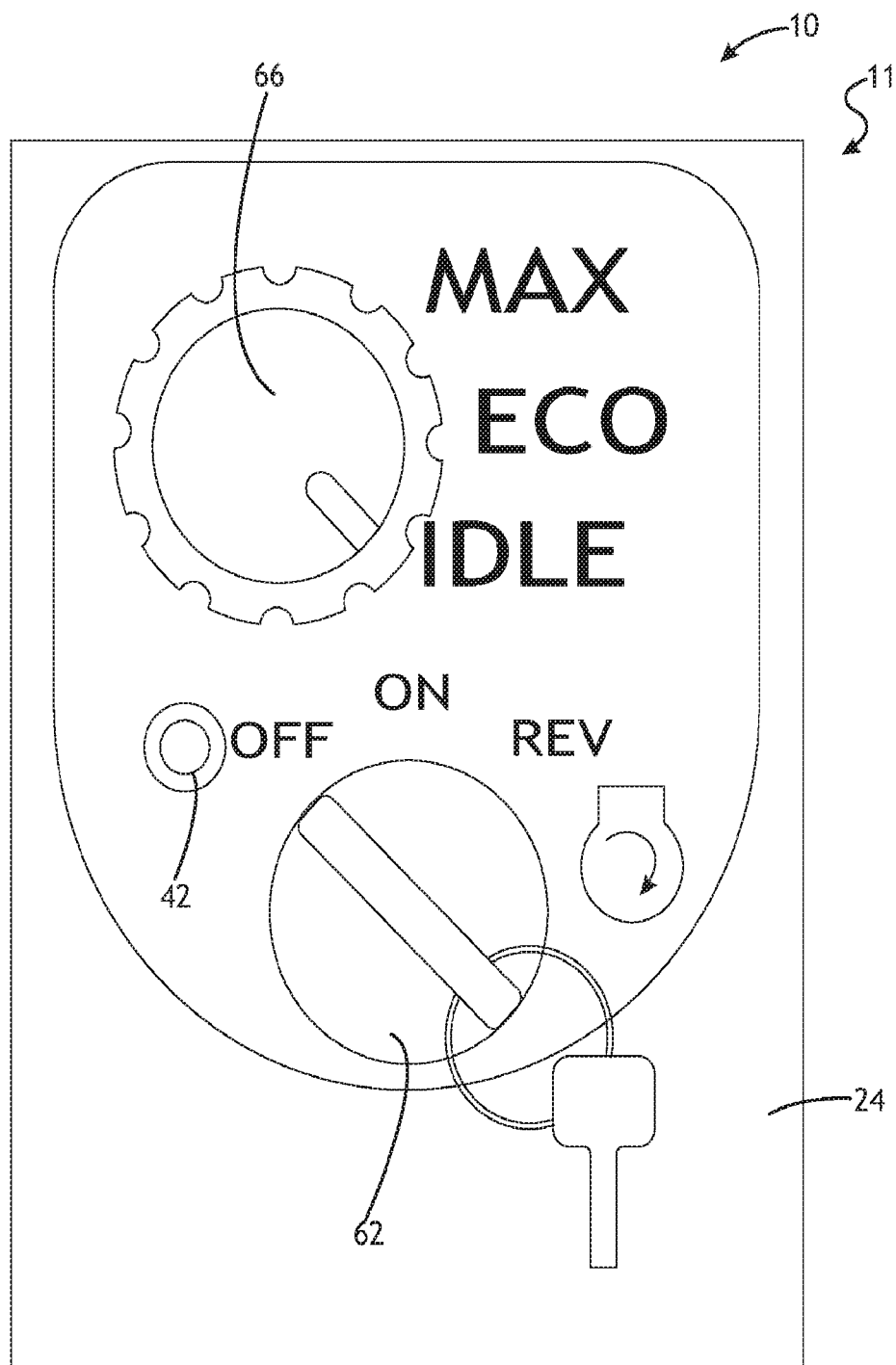
FIG. 22 is a perspective view of an input and control module including a rotary knob to select among several engine operating modes and a key switch including a reverse lockout and start position.
Figure 23:
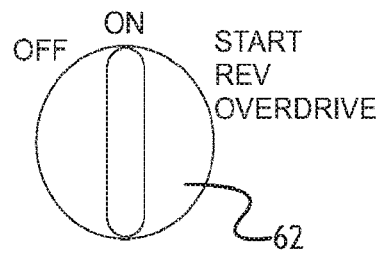
FIG. 23 is a view showing an example of use of a switch having a momentary position.
Figure 24:
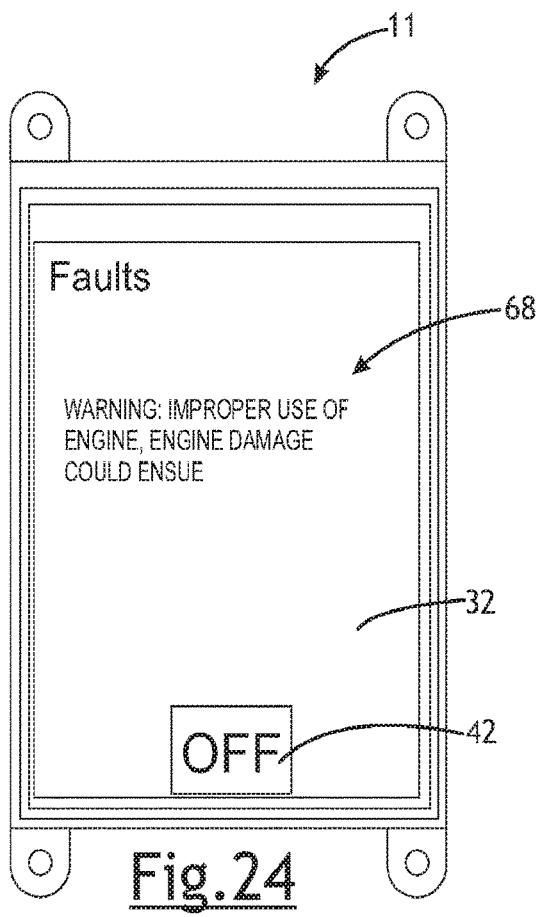
FIG. 24 is an example display screen that may show fault codes or other information.
Figure 25:
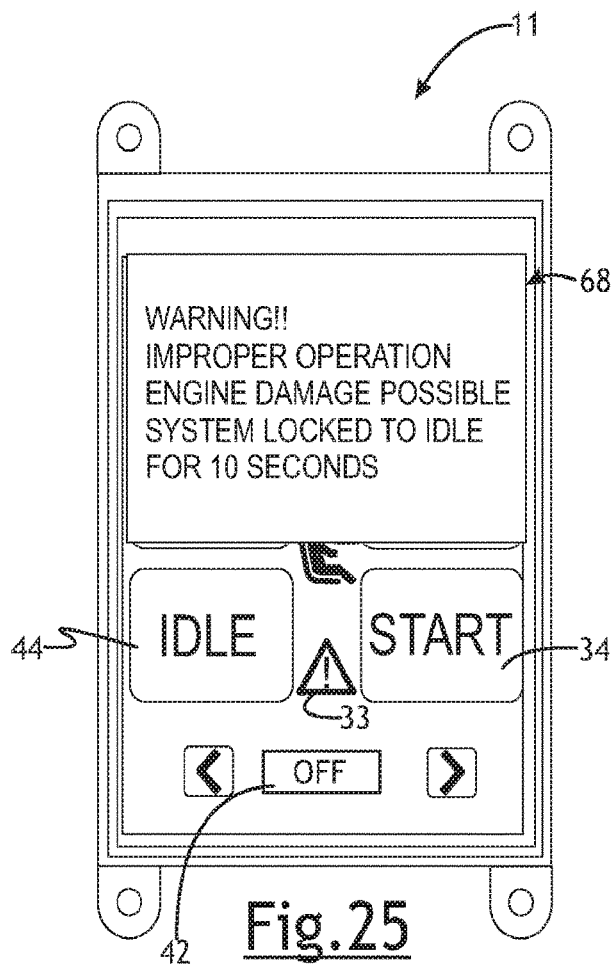
FIG. 25 is an example display screen that may show fault codes or other information including a pop up message over other inputs on the display.
Figure 26:
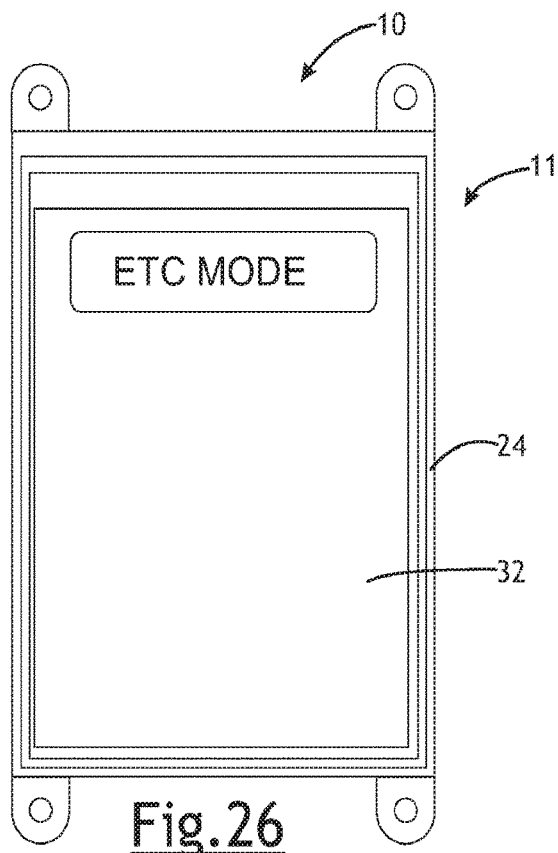
FIG. 26 is an example display screen showing an electronic throttle control mode.
Figure 27:
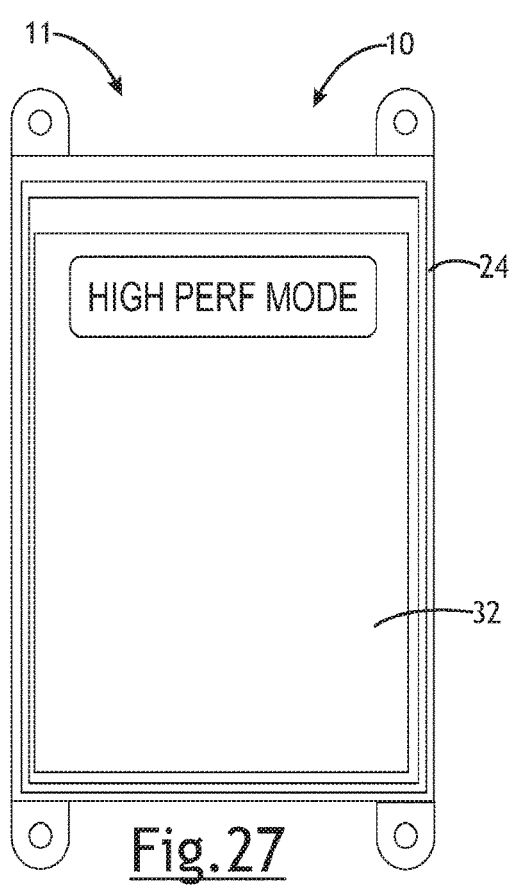
FIG. 27 is an example display screen showing an engine performance mode.
Figure 28:
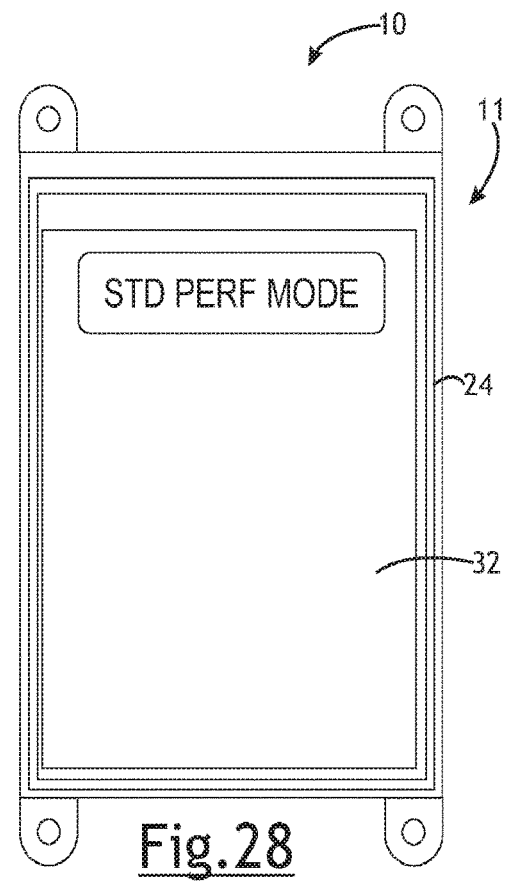
FIG. 28 is an example display screen showing another engine performance mode.
Figure 29:
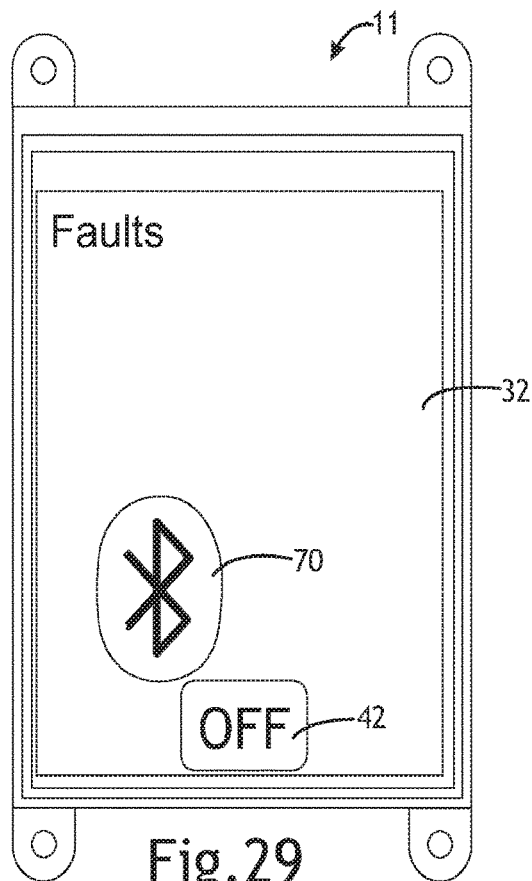
FIGS. 29 and 30 show a display for information including Bluetooth connection status.
Figure 30:
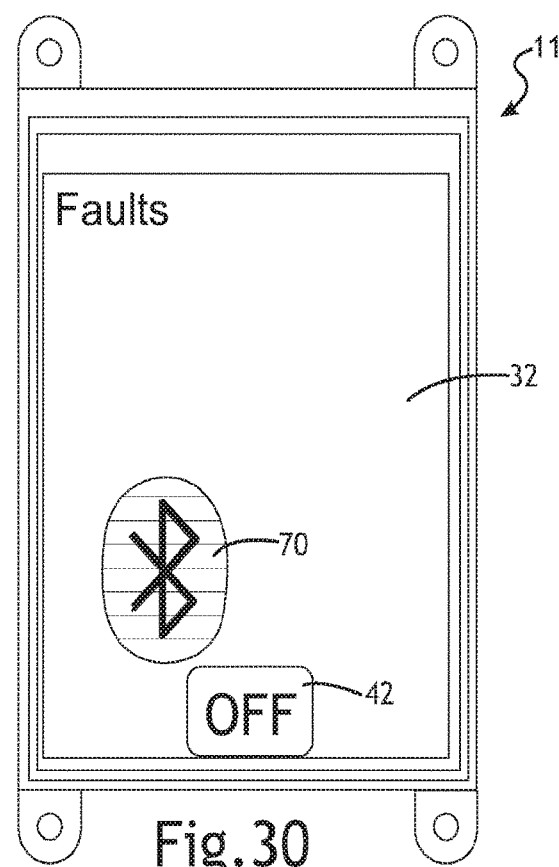

Some devices have a PTO to which one or more tools 16 or implements may be attached to be driven by the engine 14, for example mowing blades, snow throwing, rototilling, etc. In at least some implementations, it is not desirable to operate the vehicle backward, in a reverse gear, while the PTO is being actively driven. In a device having a manual PTO, the engine may be turned off if the device is put into reverse gear while the PTO is being driven. With an EPTO, the EPTO may be shut off if the vehicle is put in reverse. To enable at least some reverse operation of the device with a driven/operating PTO, the device may include a reverse override option or mode, which may be selected by the user before shifting to reverse gear. As shown in FIGS. 18, 22 and 23, the reverse override mode may be selected by actuating an input, like a switch or dial 62, by turning a key to a position associated with reverse override mode, or by selecting an option presented on the display (e.g. with a touch screen 32). Desirably, with a screen the input may be provided only when necessary (e.g. not at engine start-up, and with an EPTO, only when the EPTO is engaged/driven), and the input may be provided without a separate switch or key position, which may be more costly solutions (although acceptable and useable, as shown in FIG. 22). Further, the complexity of selecting and controlling the reverse override mode can be simplified (e.g. by providing only when necessary and without requiring a separate input dedicated to this mode.

In at least some implementations, as shown in FIGS. 22 and 23, the reverse override mode (indicated at REV on module 11) may be selected with a switch or selector 62 that also is used for at least one other function, such as starting the engine (because starting the engine and reverse override mode are not needed at the same time, which may be true of other functions as well). In this example, the module 11 does not include a touch screen or other LCD display, and instead includes discrete electromechanical inputs (e.g. dial/selector 62). The switch position for starting and reverse override may be a momentary switch—that is, the switch/dial may be spring or otherwise biased away from this position so that the switch can be turned to this position but the switch does not remain in this position after the user's hand is removed from the switch. Thus, moving the switch/dial to the position changes the state of the switch and the starting or reverse override modes maybe implemented by the controller even if the switch subsequently leaves that position. This may offer improved control of the starting process and a starter motor, and reduce potential user-caused mis-start scenarios. That is, the controller 26 may actuate the starter motor according to a defined process (and for a defined cranking duration) without requiring the user to hold the switch in the start position. Thus, a user that releases the switch 62 from the start position before the engine 14 has started will not interfere with the starting process. Similarly, the reverse override mode can be fully engaged and implemented even with momentary switch movement to that position by the user.

Using the same switch for more than one purpose may reduce the cost and simplify the user interface and actuation of the various features or modes. Further, the starting mode may be intelligently implemented to occur only when the engine is not running. This may eliminate the possibility of engaging the starter when the engine is already running and with a spinning flywheel, improving the lifespan of the parts. For example, the controller 26 may actuate the starter until the engine speed exceeds a threshold which indicates that the engine has started, or a cranking time exceeds a threshold (which may be chosen to protect or avoid overheating/damage to the starter), or the engine acceleration (first derivative of engine speed) exceeds a threshold indicating the engine has started. A non-limiting example of when to shut-off the starter is when the engine reaches 900 rpm, the deltaRpm (acceleration) reaches 60 rpm/rev, and/or the starter has been on for 3 seconds. If the engine 14 is running when start mode is terminated, a determination made by the controller (e.g. based upon engine speed), the starter is locked out and further actuation of the switch to the momentary/start position does not actuate the starter until after the engine ceases operation. This prevents accidental or improper engagement of the starter with the rotating flywheel.

The switch 62 may be coupled to the controller 26 (e.g. provide inputs to the controller based upon switch position) so that the controller is responsive to the position of the switch. In FIG. 22, the switch/dial includes an off position (and the dial 62 is in the OFF position in FIG. 22) in which power is not provided to the controller 26 or other components, an on position in which power is provided to the controller and optionally other components automatically or as commanded by the controller, and a momentary position which is used, for example, to actuate engine starting (when the engine is not running) and reverse override mode (when the engine is running).

If the engine 14 is running and the PTO is enabled, a transition of the switch to the start/reverse override position indicates to the controller 26 that the reverse PTO protection lockout should be overridden. This enables the device (e.g. tractor) to be operated in reverse with the PTO engaged/driven. A time buffer may be provided to allow a delay between actuating the override and actually actuating the PTO while in reverse gear, or shifting to reverse while the PTO is engaged. This buffer may be a number of engine revolutions/cycles or in terms of time, e.g. 3 seconds from transition of switch to permitted reverse operation override. An additional override buffer may be provided to permit, after successful entrance into override mode, an exit from that mode and a subsequent and reentrance into override mode (e.g. the vehicle may be shifted from reverse to forward gear to quickly adjust the vehicle position forward, and then shifted back into reverse to continue with reverse operation). Thus, in at least some implementations, the reverse override mode need not be selected for every desired reverse operation with an engaged PTO. If the buffer has expired, then the switch must again be moved to the reverse override position for subsequent reverse operation with engaged PTO.

As noted above, the control and input system 10 may permit a user to directly select a desired engine speed, power mode or an increase/decrease in engine speed/power, among other things. Such commands/inputs may be communicated from the input controller 26 to the engine controller 22, which may command the Electronic Throttle Control (ETC) 63 (shown diagrammatically in FIG. 1) and a fuel injection system to achieve the user desired speed or power condition. The ETC 63 may control or include a motor that actuates a throttle valve, that is, the motor may move the throttle valve between positions that relate to engine idle operation and engine high speed or wide-open throttle operation, as is known in the art. In the example shown in FIG. 18, a rotary dial/selector 64 permits a user to select a desired engine speed. Rotating the dial clockwise may increase engine speed and rotating the dial counterclockwise may decrease the engine speed. In the example of FIG. 22, a rotary dial/selector 66 may be used to permit the user to select among engine operating modes, shown as, but not limited to, MAX, ECO and IDLE. These may relate to different engine speeds all the time, or under certain conditions such as when the tool 16 driven by the engine 14 is under load.

Providing a controller associated with the throttle control options can enable the controller to moderate or provide some control over the user selected throttle positions. This may be used to protect the engine from potential damage from repeated unnecessary transitions between ETC (electric or electronic throttle control) states, may prevent the ETC and engine from entering unstable operating conditions; may reduce the likelihood of undesirable engine operation and performance attributes such as popping, backfiring, bouncing off rev/speed limiter, surging, hunting, black smoke from exhaust, etc. Without this, it may be possible for a user to rapidly command many state changes to the ETC, which can cause erratic and unpredictable behavior of the engine, evidenced by large lambda swings, undesirable sounds, and poor drivability/run quality. This prevents this behavior and discourages the user from engaging in this behavior, while improving predictable and reliable engine operation.

In general, if the user commands X number of state changes (engine throttle or speed setpoint changes or PTO changes (e.g. PTO engage/disengage commands)) within Y amount of time, the system may automatically go to a safety state for the system, for example, the system: may go to idle engine operation; may turn off an EPTO, if so equipped; may lock out other speed commands for a period of time Z; may lock out EPTO for a period of time Z; and/or may warn the user that they have attempted to enter an unsafe operating condition. By way of example, after time Z expires, the system may resume normal operation, but with the engine still in idle and perhaps the EPTO not engaged, requiring the user to move a switch or select new setting before the system moves to a new setpoint. Further, a log of this information can be stored to permanent memory in the MEM, allowing a dealer or service provider access to this information for trouble-shooting or warranty purposes.

Warnings 33, 68 can be displayed (see e.g. FIGS. 6, 7, 24 and 25) to the user when a maximum number of state changes has been exceeded, including: flashing warning light(s) on the module or display; flashing lights in switches; or warning messages (text or icon/visual) may be displayed on the screen, as desired.

In at least some implementations, the control and input system can improve engine performance, as observed by a user, by limiting the load on the engine 14 until the engine and ignition and fuel systems are ready to take on more load. This may prevent a user from trying to rapidly accelerate a cold and recently started engine, and/or start to use a tool 16 driven by the engine 14 before the engine and other systems are ready for such usage.

In at least some implementations, the system may include the control and input system which may communicate with an ETC and an engine controller, so that the user can command an engine speed, operation mode (e.g. SPORT, IDLE, MAX, ECO, etc) or other setting. After the engine has started, the engine controller controls the throttle position (e.g. by commanding the ETC) to a fixed throttle position, allowing the engine to warm up, prior to attempting to maintain a specific engine speed. During this time, the engine controller may attempt to "sync" wherein it determines which engine revolution within a pair of revolutions is the compression revolution. This may be done, for example, by comparing the time per revolution and comparing the time for consecutive cycles. The revolution including fuel chamber compression stroke may be slower and hence, take more time than the revolution including the combustion or power stroke, and a determination of engine stroke or cycle may be made. Before the engine controller is synched, the performance of the fuel injection system and engine together may be less desirable than after the sync is achieved and better fuel deliver and ignition timing may be provided.

In at least some implementations, after one or more of the following possible conditions are met, the engine controller 22 may communicate to the input and control system controller 26 that the engine 14 is ready to accept more load or commands for higher engine speeds, the conditions may include: engine temperature exceeding a threshold; and/or the engine having completed a threshold number of revolutions; and/or meeting a time threshold since the engine was started; and/or a sync being achieved; and/or a minimum engine speed is exceeded; and/or a minimum number of throttle manipulations by the user is exceeded (e.g. to rev and warm-up the engine).

During the time between engine start and enabling engine speed and load changes, the controller 26 may provide an indication to the user by, for example, doing any of the following: indicating the current mode, e.g. by illuminating a button associated with a warm-up or idle engine operation or displaying a message or text indicating the warm-up mode; disabling or hiding buttons for other engine speed setpoints or mode, or for EPTO operation on a visible display like a LCD or by disabling or ignoring actuation of buttons or switches; flashing the current mode if the user attempts to select a different mode. The other speed set points (either buttons on a display or actual switches/knobs/buttons/dials) may be "grayed out" or not illuminated to indicate to the user that these options are not yet available. FIGS. 1-7, and 16-18 illustrate some modules 11 or interfaces that may be used, along with buttons or displays that may be used to alert a user as to the engine status. Buttons similar in function to other icons/buttons previously described have been given the same reference numerals to so indicate. Of course, the buttons/switches/inputs may be used for other purposes or functions and the illustrated modules are merely representative of some options readily understood to persons of skill in this art.

After the engine is ready to accept speed and load changes, the system 10 may do any of the following: enable or show buttons for other setpoints on a visible display, as in a LCD, or make other buttons/switches/knobs/dials available for use and/or illuminated; immediately go to a selected state other than idle or warm-up mode, as in the case of a physical rotary, toggle, or other electrical switch; allow the activation of the EPTO, if user may activate it. Further, a display may be provided to inform the user that the speed/load may be changed, or other parameters changed (e.g. the EPTO).

The system 10 may also set the target speed for the engine 14 (e.g. set point(s) and other control variable of the ETC) based on the state of the PTO. This may allow matching of target speed to a particular PTO implementation (e.g. mowing deck, snowblower, rototiller, etc), and allow multiple speeds, tailored to driving and working modes for the device being used. This may further permit better calibration of ETC control method, based on load.

The system 10 may include an ETC and may be integrated into the engine controller 22. The system 10 may also include a throttle body 30, an input and control module 11 and a device including the engine 14 and a PTO operable with one or more accessories or attachments.

In one example, the system 10 allows for the user to choose a target engine speed or mode, such as ECO mode, indicating that they would like a quieter operation with lower fuel consumption than standard. In this example, the target engine speed in ECO is 2,600 rpm, which offers lower fuel consumption and reduced engine noise, while still allowing a comfortable speed at which to drive the lawnmower. The user can then activate the PTO, at which point the system increases the engine speed to a speed that offers additional torque and blade tip speed advantages, suitable for operation of the device with the PTO engaged. In this example, the target speed in ECO with the PTO on is higher than without the PTO engaged, for example 3,060 rpm, which offers a better torque profile than at 2,600 rpm while still being more economical than a higher target speed than used by some products in the market. These speeds are representative of just one example and any other desired speed setpoints may be used, including more than two setpoints, as desired.

The advantage of the ETC in this case is the ability to provide multiple target speed setpoints to accommodate, for example, a loaded (PTO on) target speed setpoint greater than unloaded PTO setpoint. The setpoints may be automatically selected and enacted upon occurrence of a triggering condition, for example, engaging the PTO.

Typically, with an engine having a mechanical governor, the loaded speed will be less than the unloaded speed, due to droop. With the ETC and related control system, continual droop (continuous engine speed reduction as load increases) can be avoided at either speed (lower, unloaded speed or higher, loaded speed). The controller can monitor the speed and make adjustments to the ETC to change the engine speed as needed to avoid droop and maintain a generally constant engine speed at any of the multiple setpoints. This may provide a more consistent operation of the engine and PTO (e.g. more consistent torque to the PTO).

In another example, the system allows the user to choose a target speed or mode, such as MAX, indicating that they would like a faster travel speed and increased performance compared to the ECO mode of the prior example. In this example, the target speed in MAX is 3,600 rpm, which offers increased horsepower and travel speed (i.e. increased engine speed=increased tractor travel speed). The user can then activate the PTO, at which point the system decreases the engine speed to a speed that insures that, through belt/pulley reduction, the engine does not exceed a threshold for the PTO, e.g. a maximum blade tip speed. In this example, the target speed in MAX with the PTO on would be 3,300 rpm, which offers more peak horsepower than 3,060 (noted above in the ECO mode example), while keeping blade tip speed below the desired threshold.

Again, the ETC and control system enables multiple target speed setpoints, this time including an unloaded target speed that offers advantages in ground speed, for transport, while offering a PTO engaged speed that satisfies reduced speed threshold as related to blade speed. Again, the speed setpoints can be achieved and maintained without the magnitude of droop associated with mechanical governors. In general, this offers greater control than a mechanical system, and offers setpoint options simply not possible with a mechanical system (such as the ECO mode example above), while simplifying the system for the user (the user doesn't need to know any of this information in order to achieve what they naturally expect from the system, the user just needs to choose a mode and engage/disengage the PTO—the system manages the engine speeds to the desired setpoints in response).

The system further offers the potential to input feed forward load changes to the system to assist in PTO engagement and engine response. For example, when the user engages the PTO (either by electrical means for an EPTO or by moving a lever to engage a manual PTO), the system can detect this and react as follows. The system uses the command for EPTO engagement or Manual PTO switch state to determine when the PTO is being engaged. In response, the system can feed forward an increase in throttle, prior to the PTO being engaged and the PTO load being actively driven by the engine, allowing the engine to start producing additional torque prior to being loaded. This offers advantages in engine response to the load and reduces any decrease in engine speed as the load is engaged.

In the case of the EPTO, when the user commands the EPTO ON, the system can input the feed forward to increase torque, wait a small amount of time, then engage the EPTO, further improving the control of the system/engine. In the case of the EPTO, when the user commands the EPTO OFF, the system can input a feed forward to decrease torque as the system disengages the EPTO, further improving the control of the system/engine. Similar control can be achieved with a manual PTO in response to the change in position of an engagement lever for the PTO (or the change in state of a switch associated with an engagement lever or other actuator).

The system can further offer different target speed setpoints, based on the PTO attachment used, as different attachments may have different maximum, minimum or preferred speeds and may provide a different load on the engine requiring different feed forward control schemes. For instance, if snowblower operates better at 2900 rpm than it does at a default speed, this can be set and implemented only when a snowblower attachment is coupled to the device. The PTO target speed setpoints can be set by a dealer, by user choice as set up in the input and control system (e.g. using buttons or LCD to choose among options); auto-detection based on RFID tag in PTO attachment; auto-detection based on voltage feedback from PTO attachment (e.g. a resistance placed in the attachment harness determines the type of attachment). The controller may measure or determine the voltage across the attachment harness and choose the pre-programmed target speed setpoint for that piece of equipment.

In an example of the system, when the engine is running and the system is in ECO with a target speed of 2,600 rpm, the user commands engagement of the EPTO. In response, the system commands a feed forward representative of the necessary torque increase to accept the EPTO load at the current target speed, e.g. the system commands a new target speed of 3,060 rpm. A timer is started and when the timer is greater than or equal to a feed_forward_positive_torque_delay (e.g. a delay set to ensure that the desired set point is achieved prior to PTO engagement) then the system activates the EPTO and normal operation is permitted.

With the engine running at 3,060 rpm, the user commands the EPTO OFF. In response, the system commands a feed forward representative of the necessary torque decrease to accept the EPTO load release at the current target speed, for example, the system commands a new target speed of 2,600 rpm. A timer is started and if the timer is greater than or equal to a feed_forward_negative_torque_delay (a delay to ensure that the engine speed change is made before disengagement of the PTO, then the system deactivates or disengages the EPTO.

The following example is for a device with a manual PTO, the engine is running and the system is in ECO with a target speed of 2,600 rpm. When the user moves a lever or other actuator to engage the PTO, a PTO switch state changes and the system detects the switch state change and commands a feed forward representative of the necessary torque increase to accept the PTO load at the current target speed, for example, by commanding a new target speed of 3,060 rpm. A timer may be started and when the timer is greater than or equal to a feed_forward_positive_torque_delay normal system operation may commence. When the user moves the lever to disengage the manual PTO, the PTO switch changes state and the system commands a feed forward representative of the necessary torque decrease to accept the PTO load release at the current target speed. For example, the system commands a new target speed of 2,600 rpm and when a feed_forward_negative_torque_delay has passed normal system operation may resume/commence. Of course, these are just examples and other methods and systems may be used to achieve other set points or desired modes of operation of the engine and PTO.

The system also allows other adjustment or customization of the engine operation. For example, some users would like the increased reactivity of the ETC, for example, as compared to mechanical governor, and some users would like a softer reactivity. The system may allow a user a simple way to modify the ETC calibration to soften or increase the response of the engine to load inputs, may allow the user to select which mode they would like in a simple manner and allow this to be easily calibrated after the base system has been calibrated. This eliminates the need to fully calibrate the system to operation in multiple ways, or to fully calibrate multiple systems.

The input and control system 10 enables a user via one or more inputs, such as button(s) or the like, to control the reactivity of the ETC based on any combination or single of the following feedback from the engine controller or other controller: engine temperature>=minimum temperature to tailor ETC; engine revs>=min engine revs to tailor ETC; and engine speed>=min engine speed to tailor ETC. If the engine controller is "Sync'd," (has determined which revolution within cycle is the compression revolution), the actual speed is measured and compared to a target speed or range of speeds. The throttle is driven open if actual speed is less than target speed, the throttle is driven closed if actual speed is greater than target speed, and the throttle is not driven if actual speed is within a tolerance of the target speed.

The amount that throttle is driven is calculated based on the difference between actual speed and target speed, with a scalar applied, referred to as the output_scale. The measurement of actual speed, the comparison with the target speed, and the driving of the throttle may be executed at a frequency of etc_calc_revs, a value measured in revolutions.

User inputs to tailor ETC (Electronic Throttle Control) to user preference—if user presses button indicating higher reactivity mode for ETC (often termed Performance or Sport mode or similar), then send command serially or via analog voltage level to ECM to indicate use of more reactive (higher sensitivity) control parameters for ETC. If user presses button indication lower reactivity mode for ETC (often termed Standard, Touring, Eco mode or similar, generally shown in FIGS. 26-28), then send command serially or via analog voltage level to ECM to indicate use of less reactive control parameters for the ETC. In higher reactivity mode, base calculations noted below may be used. In lower reactivity mode, the base calculations may be used, modified by corrections for reducing sensitivity of the system. For example, output_scale is multiplied by a value less than 1, resulting in a lower reaction to differences between actual speed and target speed. Etc_calc_revs is multiplied by a value greater than 1, resulting in slower reactions to differences between actual speed and target speed.

In an example system, when the engine is running and the user has selected higher reactivity mode for ETC, the engine controller counts revs, ETC_rev_timer. If ETC_rev_timer>=etc_calc_revs, then the difference between the actual speed and target speed is determined. The difference is multiplied by output_scale, a value less than 1, to determine amount to drive throttle. Throttle is driven open if actual speed is less than target speed, and throttle is driven closed if actual speed is greater than target speed. When the engine is running and the user selects lower reactivity mode, the engine controller counts revs, ETC_rev_timer. If ETC_rev_timer>=(etc_calc_revs*low_react_timer_scalar), then low_react_timer_scalar is a value greater than 1, slowing the reaction speed of the ETC strategy. The engine controller determines difference between actual speed and target speed, the difference is multiplied by output_scale, a value less than 1, to determine temporary throttle output, temp_throttle_out. Throttle output is set equal to (temp_throttle_out*low_react_output_scalar), where low_react_output_scalar is a value less than 1, reducing the output magnitude of the ETC strategy. The throttle is driven open if actual speed is less than target speed, and the throttle is driven closed if actual speed is greater than target speed.

The system may further allow and control remote starting of the engine, such as by a Bluetooth connection with a mobile device. Allows consumer convenience of starting and warming up application prior to use, for example, in cold weather. May protect against user other than the person with the passcode from driving the vehicle after remote start, for example, by requiring a user to enter a passcode before user control of the device is permitted.

In at least some implementations, the control and input controller 26 may receive power from the battery, and may be in standby or other waiting mode when the engine 14 is not running. Other components may be off, that is, not powered. A user may start the engine using a previously paired mobile device (previously paired with the Bluetooth module of the device, represented by icon 70 on interface/screen 32 to be started)—see e.g. FIGS. 29 and 30. When the mobile device connects with the on-board Bluetooth module (shown generally at 72 in FIGS. 2 and 3, the controller may determine if certain initial conditions are met such that the engine may be remotely started. Representative initial conditions include that the seat is empty; or brake is engaged; PTO is not engaged; device is not in reverse gear; the engine is not running; the engine is not in disrepair and does not have any disabling fault conditions such that the engine should not be started. If the required (if any) initial conditions are satisfied, then remote start may be enabled and the command to start engine is sent to the input and control system 10 and/or engine controller 22.

Figures 16, 17:
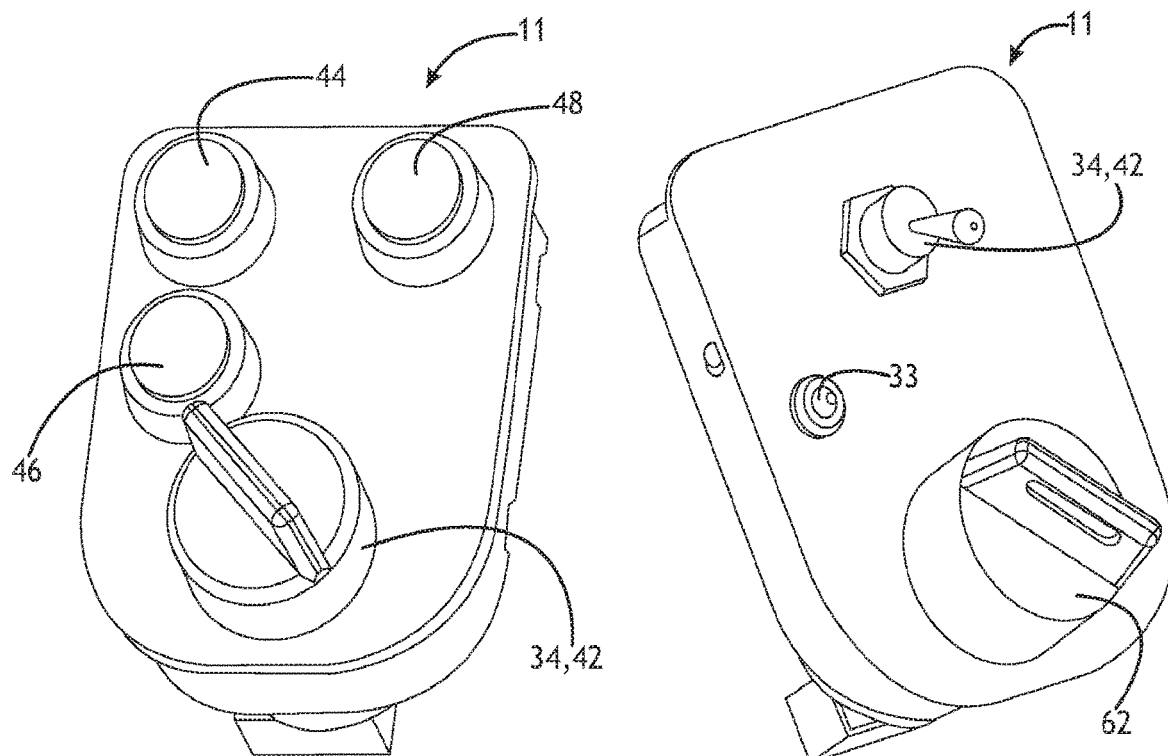
FIG. 16 is a perspective view of an input and control module including discrete input buttons and a dial or key switch that may be rotated between different positions.
FIG. 17 is a perspective view of an input and control module including a toggle switch and a key switch or other rotary input.

Before starting the engine 14, the engine speed may be determined to ensure that the engine speed is less than a start_rpm_threshold for a threshold amount of time (start_rpm_debounce_time). If so, the controller 26 may actuate the starter until either: the engine speed>=start_rpm_threshold for time>=start_rpm_debounce_time, or time_starter_on>=max_starter_engage_time (chosen, for example, to prevent overheating or other damage to starter). If engine speed>=start_rpm_threshold then it is determined that the engine has started. Thereafter, the input and controller system 10 may enable entry of a passcode (e.g. via the numeric keypad in FIG. 31) or wait for a key to be inserted into a key switch and the key switch moved to an on or operating position. Even without entry of a passcode or insertion of a key or the like, it may be possible to turn the engine off to ensure that rapid termination of the engine 14 may be achieved if needed or desired, as shown in FIG. 31. This may be enabled via an OFF button 42 on the display or elsewhere, or a switch such as shown in FIGS. 16 and 17 (even, perhaps the key switch which could be turned to off even without a key present). In at least some implementations, after starting, the engine 14 may remain running so long as one or more conditions are met. Some representative conditions include that the brake is engaged, reverse gear is not engaged, and/or the PTO is not engaged. If the user sits on the seat and enters the proper passcode on the LCD (or uses a key), then the controller 26 will allow the engine 14 to change speed setpoints, allow engine to continue running when brake is disengaged, when PTO is engaged, etc.

The system 10 may enable the device/engine application, typically a garden tractor, to have the ability to start and stop automatically when deemed applicable. The system 10 may manage the starting and stopping based on the brake switch input, the PTO state, and the controller 26 and its user interface 32 (e.g. LCD touch display). Stopping the engine 14 may reduce unnecessary noise and fuel consumption when unit is parked, replacing idle time with off time and producing zero sound when not commanded. This may be done without the user needing to press buttons or turn keys or actuate switches, making the process near-invisible to the user. The system may take advantage of the natural instinct of the user to typically use the brake on a lawn and garden device (e.g. riding mower or tractor) when parking the device.

The Start-Stop Strategy (SSS) may be activated after the engine is started normally through normal methods for the system. Additionally, a button/icon 74 can be offered in the LCD interface 32 or via another input to enable and disable the SSS as the user desires (representative display screens shown in FIGS. 32 and 33). In general, when the brake has been engaged/active for X time and the PTO is off, the engine 14 will shut down instead of continuing to idle. If the user remains in the seat, the engine 14 will remain off until the brake is disengaged. During this time, the LCD 32 may continue to show the normal buttons, including the START button and/or the SSS mode button 74, in case the user wants to override the SSS or make other changes. If the user does not remain in the seat, the system 10 starts a timer. If the user is back in the seat before the timer expires, the timer is reset and stops counting. If the brake is released when the user is back in the seat, and the above was true, the engine 14 will restart immediately and the controller 26 will command the previous engine speed setpoint. If the user is not back in the seat before the timer expires, the passcode entry screen (e.g. as shown in FIGS. 19-21 and 31) will be displayed on the LCD 32 and SSS will be disabled. If the brake is released when the user is back in the seat after the above, the engine 14 will not start and will instead need to be re-started by the user.

The system 10 may be used as follows. The engine 14 is started via normal means (start button, remote start, etc) and running, the user is on seat and SSS is enabled, which can optionally be the default setting in place when the engine is started, or can be chosen by the user. Then, when the user engages brake (sensed by brake switch input to MEM), the controller 26 stores the current engine speed setpoint as prev_speed_control_setpoint, and the controller starts a timer. If timer>=SSS_brake_on_stop_timer_threshold, then turn off engine 14 by sending software KILL command to the engine controller 22, leaving power to the engine controller 22. If the user remains in the seat (sensed by seat switch input), no changes on LCD display 32 as far as options presented to the user. If the user disengages the brake (sensed by brake switch input), restart engine, driving the starter until either: engine speed>=start_rpm_threshold for time>=start_rpm_debounce_time; or time_starter_on>=max_starter_engage_time. If engine starting is indicated (e.g. if engine speed>=start_rpm_threshold) then enable and highlight previous engine speed setpoint, stored in prev_speed_control_setpoint and resume normal operation.

If the user did not remain in seat during engine not running state, the controller 26 starts a timer. If the user returns to seat and timer<max_out_seat_time, then reset timer and enable the engine to resume operation upon release of brake. If timer>=max_out_seat_time, then the SSS is disabled, and the user will have to restart the engine 14. Entry of a passcode may be required, if desired. In that case, the LCD display 32 will change to the passcode entry screen, requiring passcode entry to continue operating vehicle. SSS is disabled until passcode is entered and engine is restarted via normal means.

The system 10 may also enable a simplified control scheme that may achieve desired engine operation (e.g. speed and torque) over a wide range of operating conditions with minimal user input. The system may determine the optimal engine speed target speed setpoint for electronic throttle-based governing, based on the required throttle to supply the currently commanded load. The system may utilize engine speed and throttle position to make this determination and utilize the ETC 63 to maintain the engine speed target speed setpoint even as conditions change. This may reduce or eliminate the need for any user input device to determine necessary setpoint. This may reduce cost by eliminating electrical switches, potentiometers, etc, or LCD inputs 12 used to allow the user to choose the engine speed target speed setpoint, may reduce complexity for consumers looking for an experience more akin to a car—start the tractor (or other device), push the pedal to accelerate/go without the need to set engine speed. Among other things, this may appeal to younger or less skilled users who might not be familiar with throttle and engine speed/torque setpoints.

An operating procedure for at least some implementations is set forth below. After the engine is started, and the initial startup sequence is completed and the engine is ready to enter speed control mode, the engine controller or input system controller may set the speed control mode/setpoint to IDLE. The ETC 63 then attempts to maintain the engine speed calibrated for IDLE, for example, 1,800 rpm. If the throttle necessary to maintain 1,800 rpm is greater than a threshold, idle_max_throttle, then the system changes to a moderate engine speed setpoint. For example, if throttle>7%, the system moves to a mid-speed setpoint, such as 2,600 rpm.

If the PTO engages while the speed setpoint is set to 1,800 rpm, the system changes to a moderate engine speed with PTO setpoint, for example, the engine speed is increased to 3,060 rpm (better torque for operation of PTO then at lower speed). The ETC 63 then attempts to maintain the engine speed calibrated for the moderate engine speed setpoint, for example 2,600 rpm. If the throttle necessary to maintain 2,600 rpm is greater than a threshold, midspeed_max_throttle, then the system changes to a max power engine speed setpoint. For example, if throttle>13%, move to a max power speed setpoint, such as 3,400 rpm.

If the throttle necessary to maintain the moderate engine speed with PTO setpoint, for example 3,060 rpm, is greater than a threshold midspeed_PTO_max_throttle, move to a max power PTO speed setpoint such as 3,300 rpm. For example, if throttle>70%, move to a max power with PTO speed setpoint, such as 3,300 rpm. If the throttle necessary to maintain the max power engine speed with PTO setpoint, for example 3,300 rpm, is less than a threshold maxspeed_PTO_min_throttle, move to a mid-speed PTO speed setpoint such as 3,060 rpm. For example, if throttle<37%, move to a mid-speed with PTO speed setpoint, such as 3,060 rpm.

If the throttle necessary to maintain the max power engine speed setpoint, for example 3,400 rpm, is less than a threshold maxspeed_min_throttle, move to a mid-speed speed setpoint such as 2,600 rpm. For example, if throttle<18%, move to a mid-speed engine speed setpoint, such as 2,600 pm. If the throttle necessary to maintain the mid-speed engine speed setpoint, for example 2,600 rpm, is less than a threshold midspeed_min_throttle, move to an idle speed setpoint such as 1,800 rpm. For example, if throttle<12%, move to an idle speed setpoint such as 1,800 rpm.

If the PTO engages while the target engine speed is set to a moderate engine speed setpoint, move to a moderate engine speed with PTO, such as 3,060 rpm. If the PTO engages while the target engine speed is set to a max power engine speed setpoint, move to a max power engine speed with PTO, such as 3,300 rpm.

Accordingly, several speed setpoints can be used and the system 10 may automatically choose among them based upon several factors, including but not limited to, current engine speed, desired speed setpoint and PTO state (e.g. engaged/disengaged). In this way, the engine speed may be selected automatically without requiring direct user control and without requiring the user to know which speed the engine should be changed to under the varying conditions of operation.

Figure 34:
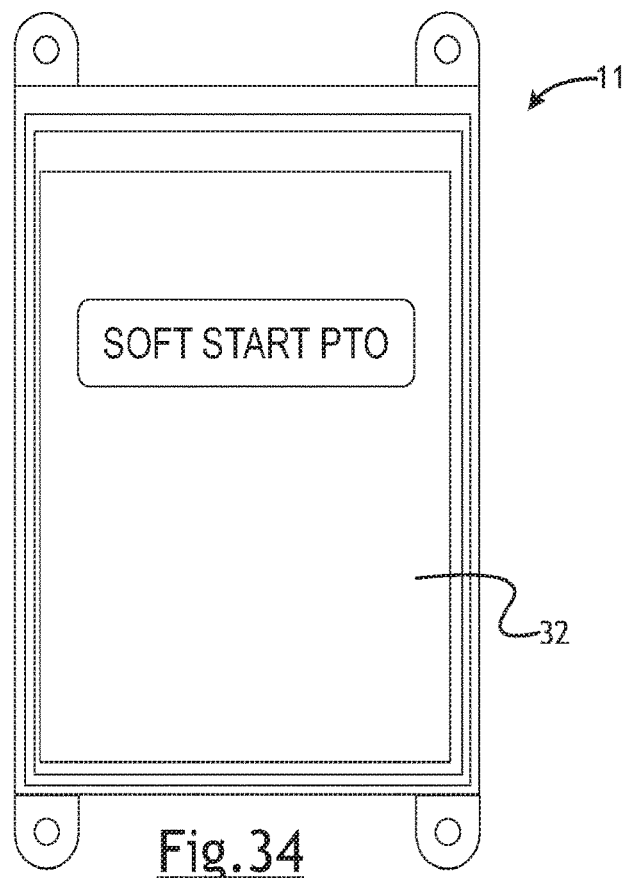
FIG. 34 is an example of a display in a soft start PTO mode.

The input and control system 10 may also reduce the instantaneous torque impulse into the system when the PTO is engaged by reducing the engine speed prior to engaging the EPTO then resuming the previous or a new engine speed after the PTO is fully engaged. In this way, a lower torque is applied to start spinning the PTO and less shock or impulse is imparted to the PTO and to the engine and remainder of the device. This may reduce wear on the device (e.g. on belts, pulleys, deck, frame, etc), typically a tractor, by reducing the torque impulse when the PTO is engaged. This may also reduce noise and vibration when engaging the PTO, improving the user's experience with the product. The mode may be indicated to the user, for example, as shown via icon 76 in FIG. 34, and FIG. 35 provides a graph to help explain one implementation of a feed forward scheme that may be used.

Figure 35:
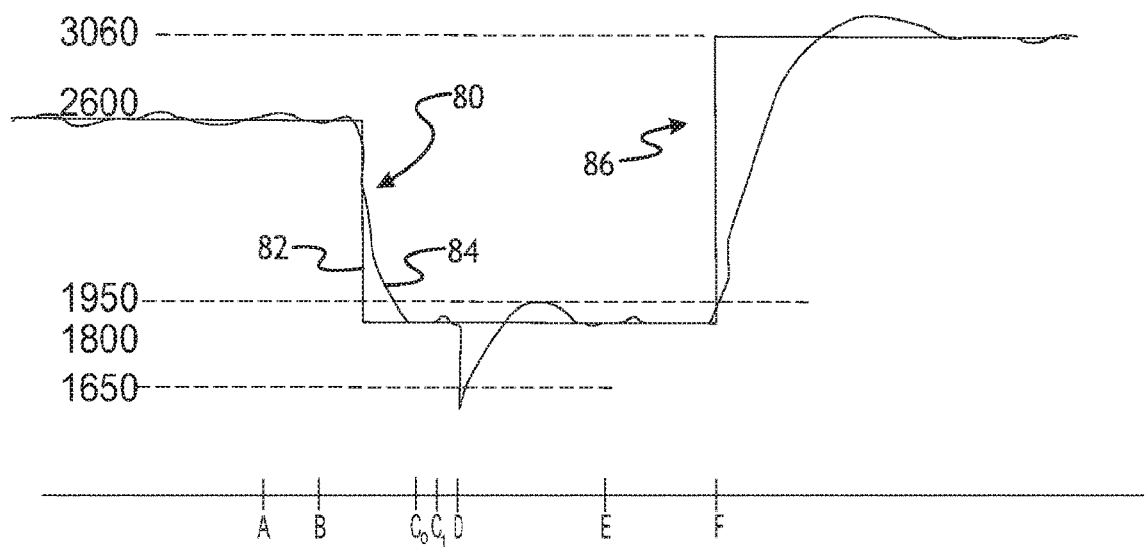
FIG. 35 is a graph showing engine speed over time with feed forward engine speed control.
Figure 36:
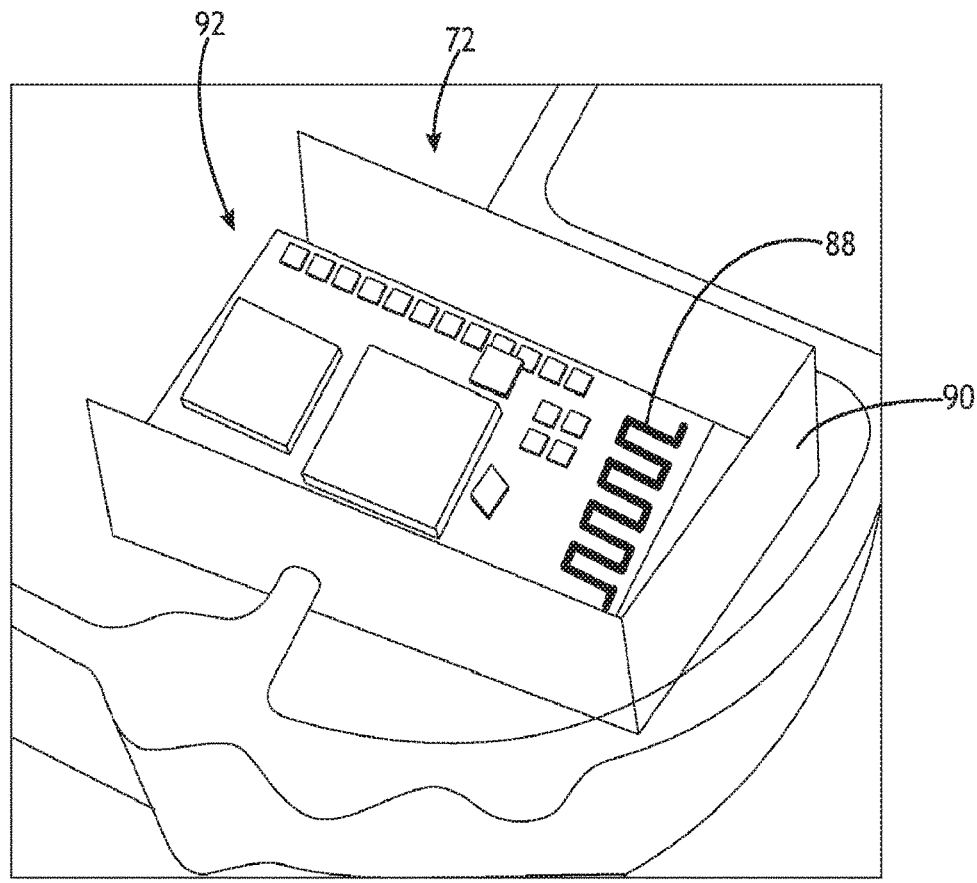
FIG. 36 is a perspective view of a Bluetooth antenna and enclosure to control signal direction.
Figure 37:
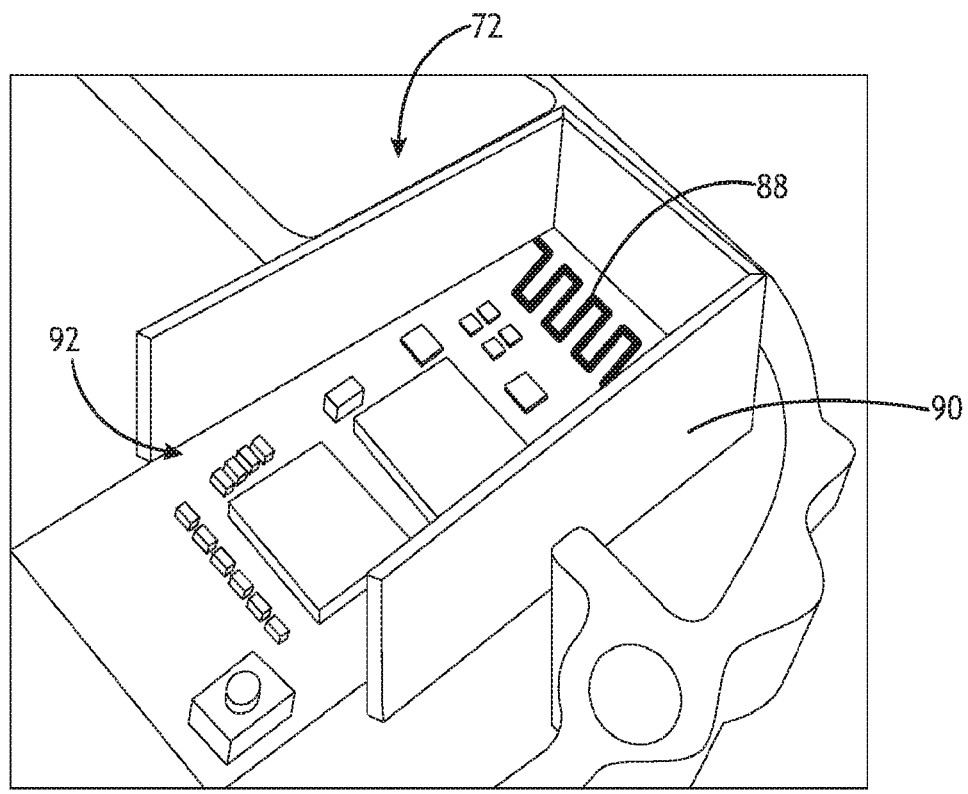
FIG. 37 is a perspective view of a Bluetooth antenna and enclosure to control signal direction.

In general, the system attempts to drive engine speed down before engaging the EPTO, as shown by the decrease in engine speed indicated at 80 in FIG. 35 which shows by line 82 a desired or target engine speed and by line 84 an actual engine speed, in one example. After the engine 14 has taken the load from the EPTO, the system attempts to drive the engine speed back up to a proper cutting/operating speed, as shown at 86. In at least some implementations, the system may be implemented/operated as set forth below.

When the engine is running and the EPTO is off, the ETC 63 maintains a set/chosen or desired engine speed, in the case of this example, 2,600 rpm. When the user engages the EPTO, such as by selecting such an option from the display, or actuating a switch, the input controller 26 sends a command to the engine controller to reduce the engine speed, for example to an idle speed setpoint, in this example 1,800 rpm.

The input controller 26 or other controller (e.g. controller 22) may then monitor the engine speed. If the engine speed<=max_idle_threshold_speed for a continuous time>=min_idle_time_before_PTO_engage, then the controller sends an EPTO_Feed_Forward command to the engine controller and the engine controller commands a Feed Forward to the throttle calibrated to accept the EPTO load at 1,800 rpm. In this example, max_idle_threshold_speed may be 1,950 rpm and min_idle_time_before_PTO_engage may be 200 ms. In this case the feed forward may be 15% throttle, calibrated to accept the load 200 ms after start of feed forward.

The controller then waits until time_after_send_EPTO_Feed_Forward>=wait_period_after_feed_forward. In this case, the wait_period_after_feed_forward may be 200 ms, and then the EPTO is engaged by the controller. The engine speed is monitored and if the engine speed<=min_PTO_idle_threshold_speed_for a continuous time>=min_idle_time_before_ECO_engage, then the controller may send an ECOPTO command to the engine controller. In this example, minPTO_idle_threshold_speed may be 1,650 rpm and min_idle_time_before_ECO_engage may be 200 ms. The engine controller then drives the ETC to attempt to maintain the ECOPTO setpoint speed, in this case 3,060 rpm. After which, normal operation of the engine and system may resume. Of course, the speeds and times noted can be changed as desired, and may be a range of speeds instead of specific rpm limits.

The system 10 may also be configured to limit access to the device without requiring a key. This may eliminate the costly key switch, eliminate the need for the user to find and have on hand a key before using the device, eliminate the possibility of losing the key, and having to replace the key or a faulty key switch. The system may authenticate a user via Bluetooth or NFC connection to a mobile device, or the like. A bluetooth transceiver or module 72 may be included in the input and control system 10, and it may enable pairing with mobile device, entrance of a PIN or other code on the mobile device before the engine may be started and the device used. With NFC, the system may utilize the NFC tag present in most current mobile devices, and the user can set an individual NFC tag as the enabled code key. Then, when the NFC device/tag is placed close enough (e.g. a foot or so) to the controller, the controller may be enabled and ready for use. The controller 26 may remain enabled for as long as the engine 14 is running, or for a set period of time after engine operation ceases (e.g. a timer after shut off). Multiple NFC tag IDs may be stored and utilized to enable multiple users of the device. Similarly, multiple users may be given access to use the machine using the Bluetooth interface.

Other authentication means may be used, for example, a fingerprint reader on the control module/LCD screen 32 or otherwise. Multiple fingerprints may be stored and utilized to unlock (multiple users of equipment). Similarly, the system may be enabled via wifi-direct enabling from a mobile device. A wifi connection from the controller 26 (which may be diagrammatically illustrated at 72 instead of or in addition to the Bluetooth module) to the mobile device can serve as communication, when mobile device is near enough to the controller, and the controller can thereby be unlocked for use with application on mobile device, e.g. using a Bluetooth connection. Further, a direct-wired (USB, Proprietary or other) data connection may be used. The direct-wired data connection to mobile device can serve as communication, when mobile device is connected, the controller can be unlocked for use with application on mobile device using data connection.

With a Bluetooth interface, the bluetooth working/connection range can be limited to a short enough distance that connection cannot be maintained when user is not near the device, effectively turning a mobile device into a short-range RFID smart key, utilizing the ease of Bluetooth connectivity in place of a purchased or married smart key. The connection zone or area can be limited and focused, e.g. a "connection beam," to require that the user/mobile device to be within a range AND location/orientation from the Bluetooth antenna on the device including the engine. See e.g. FIGS. 36-41. This may replace NFC and RFID solutions, allowing something that most people already carry (smart/mobile device) to act as a secure keying device for enabling use of the device including the engine 14. The device may include an internal combustion engine 14, like a lawn and garden tractor, generator set, handheld device (weed trimmer, chain saw, blower, etc), utility vehicle, recreational vehicle (snowmobile, ATV, SxS, motorcycle, etc), automobile, heavy equipment, shop equipment (lathe, mill, table saw, band saw, drill press, etc), or (nearly) any other device that it would be preferable to lock out when the user is not near.

This may allow complete removal of an ignition key switch, which in most cases is now more costly than the Bluetooth module 72 (or wifi) that would replace it, driving down the cost of the system. For such devices, the user experience can be simplified for new market demographics, simply start the engine, as long as user's phone or other paired device is in their pocket or in a set range of proximity to the device being started. This may eliminate the need for costly RFID smart key controller and smart key units, the standard automotive solution to keyless entry and starting. This may take advantage of technology already built into nearly every user's mobile device and allows for enhanced feedback to the user (e.g. through a Bluetooth or wife connection).

Figure 38:
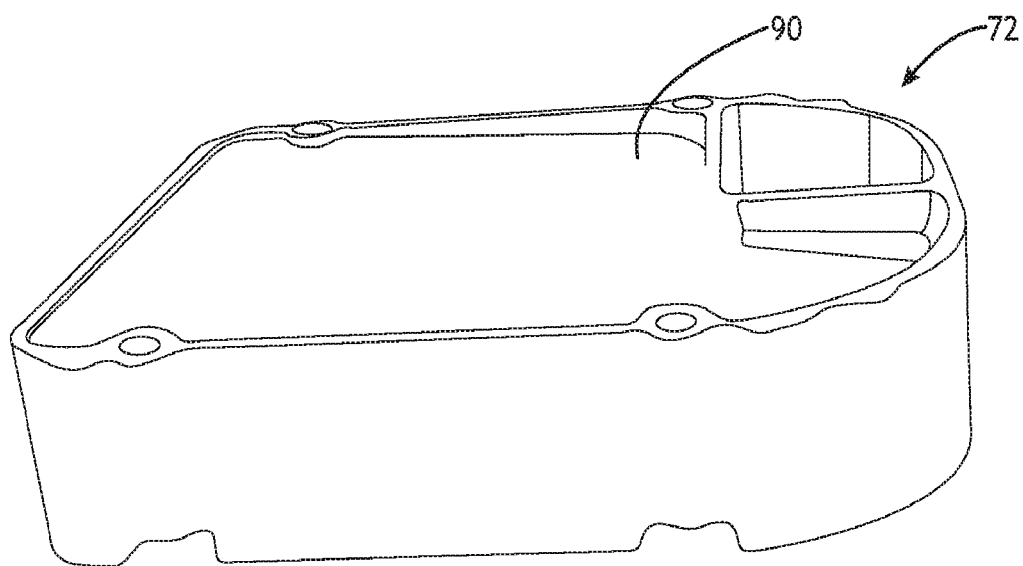
FIG. 38 is a perspective view of a control module including an internal Bluetooth antenna and a coating/potting over portion of the antenna.
Figure 39:
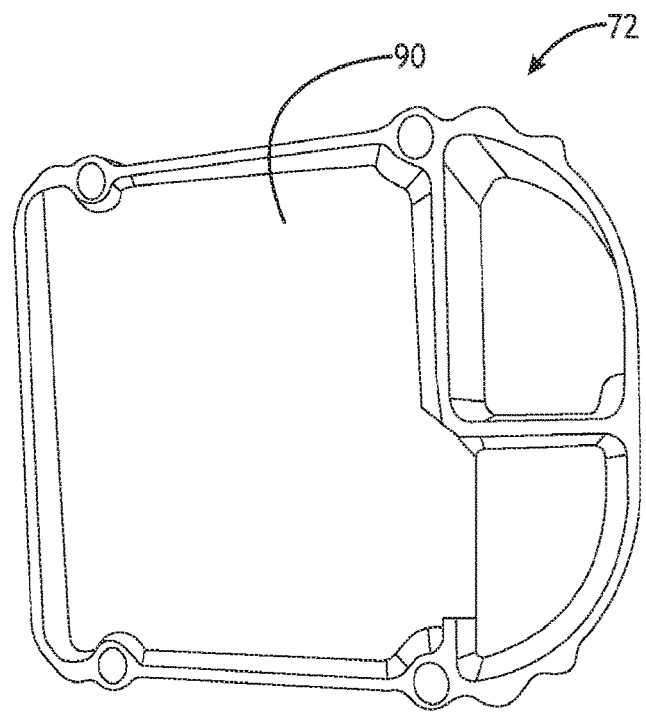
FIG. 39 is different view of the module of FIG. 38.
Figure 40:
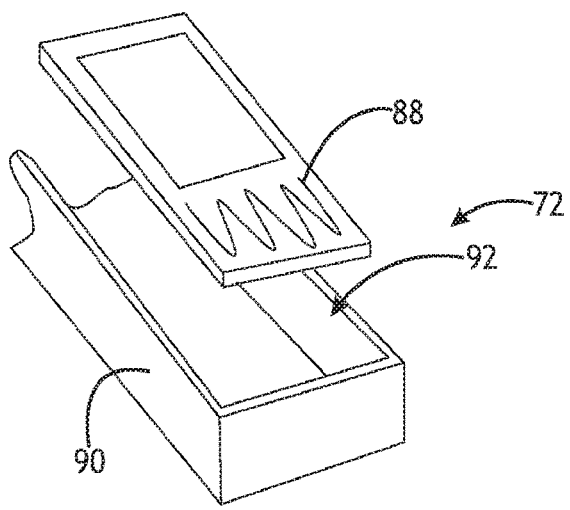
FIG. 40 is a diagrammatic view of an orientation of a Bluetooth antenna and an attenuating case.
Figure 41A:
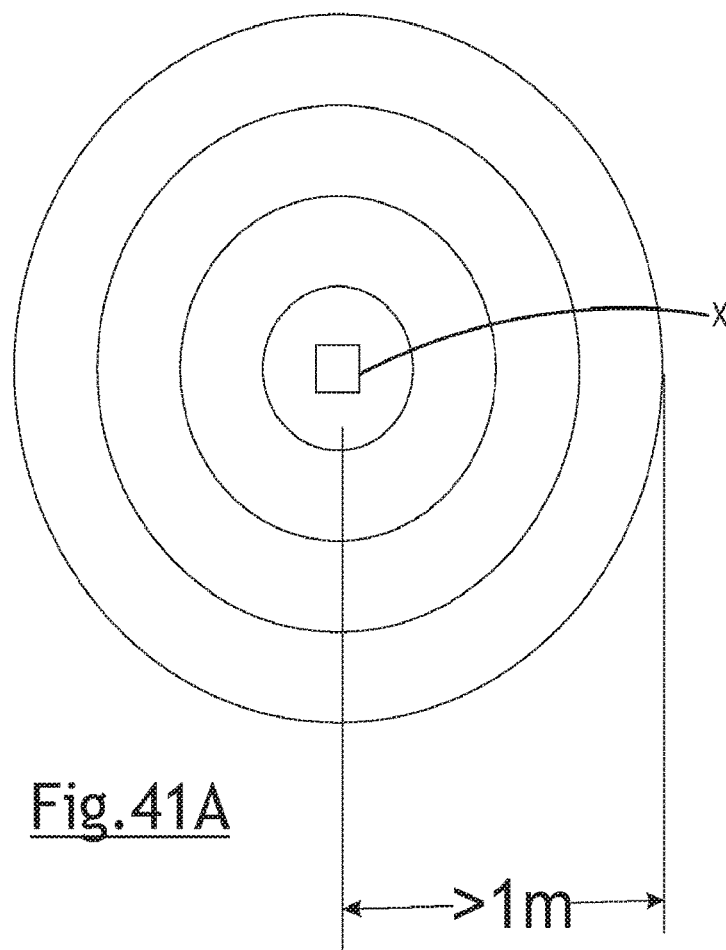
FIG. 41A is a diagrammatic view of a Bluetooth module "X" without a directional housing or covering.
Figure 41B:
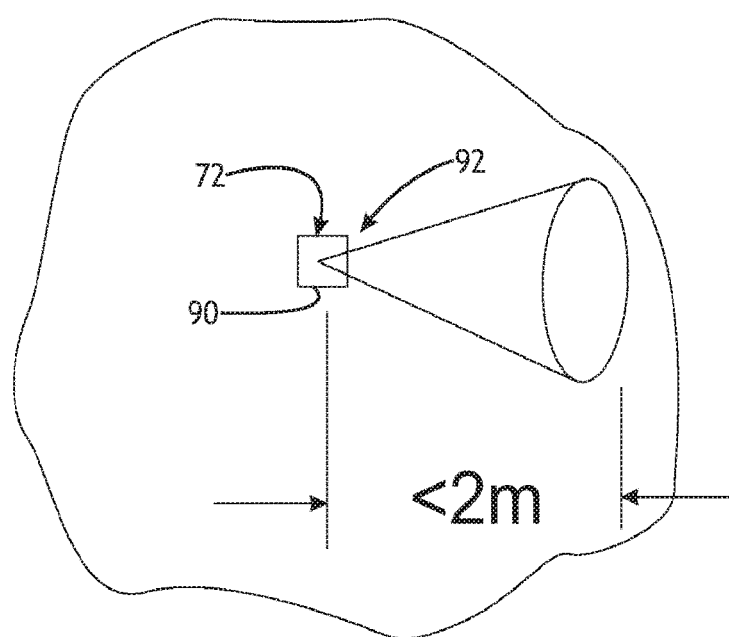
FIG. 41B is a diagrammatic view of a Bluetooth module with a direction housing or covering.

The system 10 may include a Bluetooth communication module 72 with an antenna 88 and a metallic or other dense, RF-attenuating material enclosure 90 to focus the emittance path of the Bluetooth communication module, and/or a RF-attenuating (high dielectric and/or low permeability designed to shorten wavelength) substance, such as potting or coating (e.g. as shown in FIGS. 38 and 39 wherein the antennae and other components are covered and not visible within the enclosure 90), or material that will attenuate signal to very short range (less than 2 m). Simply put—this reduces the distance Bluetooth can connect, and may limit to a specific orientation from the unit/antenna that the Bluetooth-enabled smart mobile device can be located within. The system may replace safety lockouts, like key switches, E-Stops, etc., on devices that currently require a key or lockout with something that is more secure than current solutions—keys get lost, damaged, stolen, copied, and E-stops can be disabled/bypassed, and lockouts depend on a human to make a correct choice and follow through with locking out machinery, device, etc. This is also simpler for the user, the user can simply get within a range/proximity and the device is automatically activated, without need for a key or e-stop or lockout replacement.

Once a device is paired one time, there is no need to interact with the smart mobile device to unlock the system. Can also be configured to require user to input some interaction with smart mobile device to verify proper usage or authenticate the user, if desired.

In at least some implementations, the bluetooth antenna 88 is surrounded by a RF-blocking or attenuating material or enclosure 90. The material or enclosure 90 can be on or around all but one side 92 or area, allowing for focusing the "beam" to a point-source broadcast, radiating from the unblocked surface or side 92. In at least some implementations, to unlock the device and be able to use the engine 14, the user needs to be in a specific location to unlock the application (such as a driver's seat vs. a passenger's seat, or in front of a certain part of the equipment instead of another location). This could be on some sides, but not others, allowing for focusing a point-source broadcast by shadowing certain areas, radiating from the unblocked surfaces.

The blocking or attenuating material 90 can be a metallic material or materials that significantly attenuate the signal. The material can be a material or combination of materials with high dielectric or low permeability properties that sufficiently shorten the wavelength to eliminate useable signal outside a specific area, emitted from the antenna. The remaining surface or surfaces of the Bluetooth antenna 88 can be covered with a RF attenuating material to significantly limit the connectivity range of the Bluetooth signal.

The Bluetooth antenna 88 can be designed in such a way as to significantly reduce the effective freespace length of the antenna (and reduce the bandwidth) to limit the connectivity range. Example—reduce the freespace length of the antenna from the ideal minimum of 31 mm. The Bluetooth antenna can be designed using parts that utilize materials with dielectric and permeability characteristics that sufficiently slow the electromagnetic wave within the antenna part(s), shortening the wavelength, reducing the loaded length of the antenna, which, in turn, reduces both the bandwidth and the antenna efficiency. This can significantly limit the effective range of the antenna.

Figure 10:
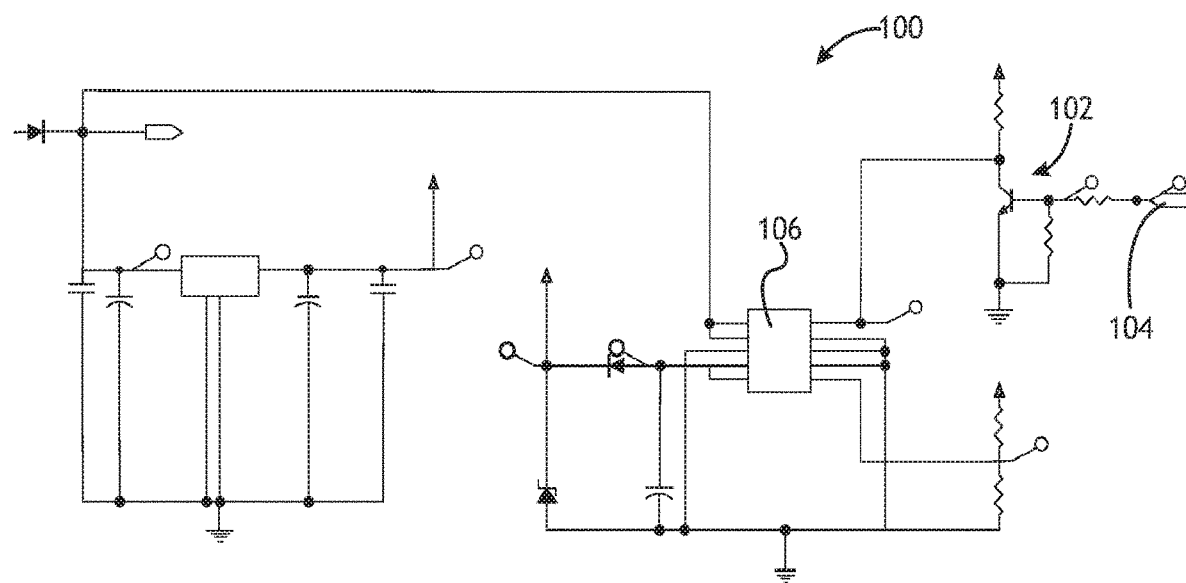
FIG. 10 is an example schematic circuit diagram for powering a microprocessor separately from the remainder of the module components.

FIGS. 10-15 illustrate different electrical circuits or portions of electrical circuits that may be used for various functions in the control module 11. For example, FIG. 10 illustrates a circuit 100, that may be used to power the controller 26 separately from the remainder of the electronics/switches of the module 11. In this example, a 5 volt power supply is provided by the controller via a battery to wake the controller from a sleep or low power mode. The controller 26 then actuates a switch, shown as a bipolar junction transistor (BJT) 102, via a module power input 104 to turn on and off a DC-DC converter 106 that powers the remainder of the module 11, indicated as the rail voltage+5 volts.

Figure 11:
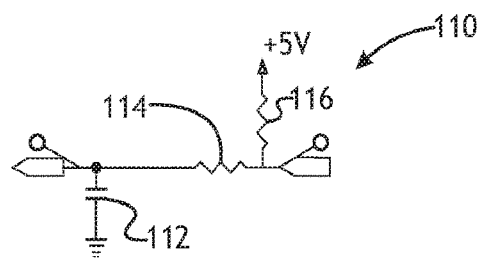
FIG. 11 is a schematic circuit diagram for processing a ground-enabled input.

FIG. 11 illustrates a basic circuit 110 that can used with controller 26 to process or determine the state of a ground-enabled switch. The capacitor 112 and resistors 114 and 116 are arranged to pull a signal up to a high signal (e.g. 5 volts) or down to a low signal (e.g. ground or zero volts) depending upon the state of the switch, where the input voltage may be provided by an output of the controller 26 or a voltage converter, such as the DC/DC converter shown in FIG. 10.

Figure 12:
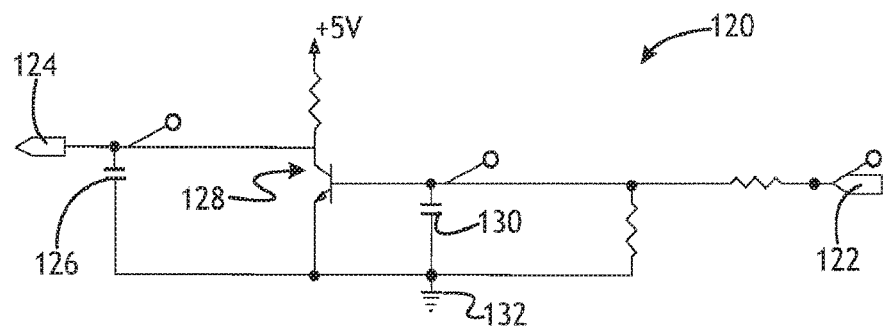
FIG. 12 is a schematic circuit diagram for processing a voltage-level input.

FIG. 12 illustrates a circuit 120 that may process a voltage-level binary switch input based upon a threshold level. For example, this may permit the controller 26 to determine if an EPTO has power. The presence of voltage at the EPTO input 122 causes the output 124 to be pulled down to a low state (e.g. to ground, or zero volts), while the absence of voltage at the EPTO input 122 will cause the output 124 to be pulled up to a high state (e.g. +5 volts). The circuit may include a first capacitor 126 coupled to the output 124 and a switch 128 (e.g. a transistor such as a BJT), and a second capacitor 130 coupled to the input 122, switch 128 and ground at 132.

Figure 13:
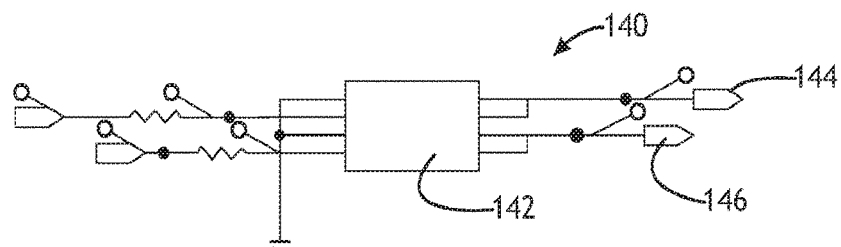
FIG. 13 is a schematic circuit diagram that may be used to drive external outputs.

FIG. 13 illustrates a driver circuit 140 that may be used to drive external outputs, such as an engine starter and an EPTO. This circuit 140 uses a dual low-side Field Effect Transistor (FET) 142 arranged to drive two discrete outputs 144, 146.

Figure 14:
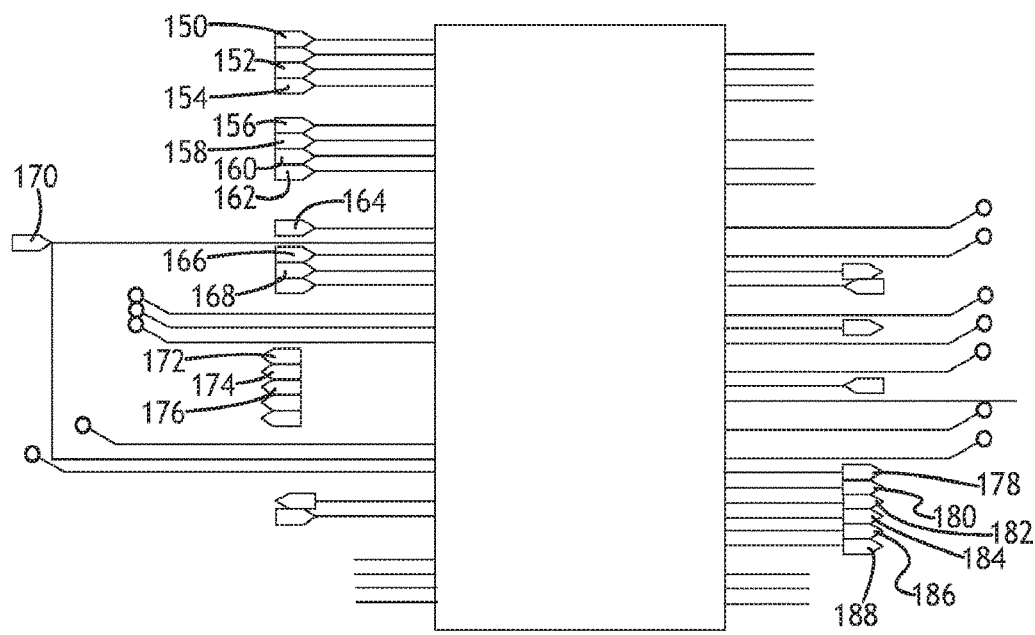
FIG. 14 is a schematic showing microcontroller inputs.

FIG. 14 illustrates controller 26 having representative inputs coupled to an idle operating mode input at 150, MAX mode input at 152, ECON mode input at 154, start button at 156, reverse input at 158, Bluetooth module at 160, reverse override input at 162, EPTO at input 164, brake switch at input 166, manual PTO at input 168, seat switch at input 170, keyswitch or on/off button at output 172, module power supply at output 174, light on/off at output 176, starter control at output 178, EPTO control at output 180, Engine controller at output 182, seat fault indicator at output 184, brake fault indicator at 186, PTO actuating signal at output 188. Of course, the inputs and outputs of the controller may be arranged in any desired manner and the above implementation is merely representative.

Figure 15:
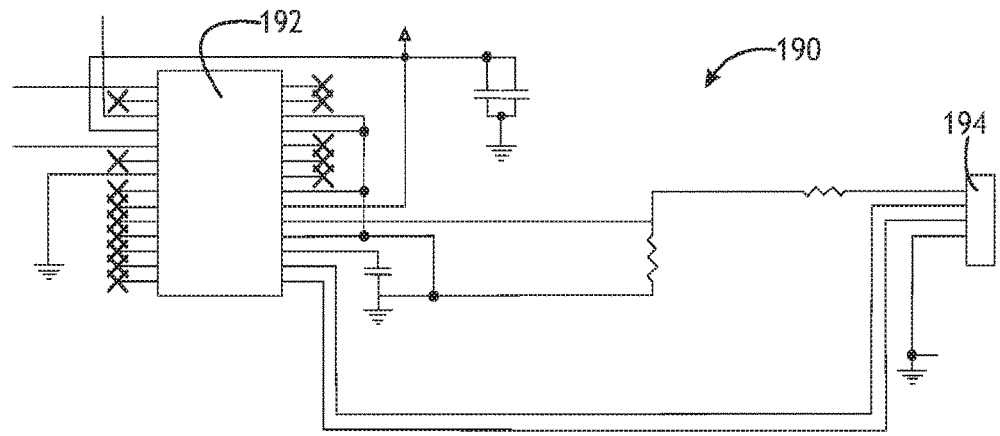
FIG. 15 is a schematic circuit diagram to allow USB communication with the controller.

FIG. 15 illustrates a circuit 190 that allows USB communication with the module 11 and the engine controller 22 by allowing low-level UART to be converted to USB communication, and includes a controller 192, and a USB connector 194 shown as a type B connector.

The forms of the invention herein disclosed constitute presently preferred embodiments and many other forms and embodiments are possible. It is not intended herein to mention all the possible equivalent forms or ramifications of the invention. It is understood that the terms used herein are merely descriptive, rather than limiting, and that various changes may be made without departing from the spirit or scope of the invention.

The invention claimed is:

1. An engine control and input system for a device having a tool driven by an engine, comprising:
  an input and control module having multiple inputs and a controller responsive to actuation of the inputs to permit user control of at least one engine operating parameter by user actuation of the inputs, wherein the inputs relate to two or more of changing engine speed, starting the engine, causing the engine to drive the tool, turning on a light, actuating a heater or warmer or stopping engine operation; and
  a switch having a first state and a second state, and wherein the controller is responsive to the state of the switch to prevent operation of at least one of the one or more inputs if the switch is in the first state and to allow operation of at least one of the one or more inputs if the switch is in the second state.

2. The system of claim 1 which includes a touch screen display that displays icons to the user relating to the inputs and the at least one engine operating parameter, and wherein the touch screen display is responsive to the user selecting one of the inputs by touching an associated one of the icons provided by the display.

3. The system of claim 1 wherein: a) the device includes a seat and the switch is associated with the seat so that the switch is in the first state when the user is not seated in the seat and the switch is in the second state when the user is seated in the seat, or b) the device includes a brake and the switch is associated with the brake so that the switch is in the first state when the brake is not applied and the switch is in the second state when the brake is applied.

4. The system of claim 1 wherein the device includes two or more engine operating modes and wherein the inputs permit a user to select one of the engine operating modes wherein the engine operating modes include at least one of a lower speed engine operating mode and a higher speed engine operating mode, or the engine operating modes include at least one of a more responsive engine operating mode and a less responsive engine operating mode.

5. The system of claim 4 which also includes memory in which is stored engine operating parameters associated with the engine operating modes, and wherein the controller is coupled to the memory and the controller is responsive to implement the engine operating parameters associated with a selected one of the engine operating modes.

6. The system of claim 2 wherein the controller commands the display to show one or more of throttle position, engine speed, engine temperature, engine hours, air temperature, oil pressure, oil temperature and at least one fault condition or warning message to the user.

7. The system of claim 1 which also includes a power source and wherein operation of at least one input is prevented by not providing power to the controller until the switch is in the second state.

8. The system of claim 7 wherein the controller is coupled to the power source and the controller is maintained in a low power mode until the switch is in the second state wherein the controller wakes up and enables at least one input for actuation.

9. The system of claim 1 which also includes a Bluetooth module to permit wireless control of the module via a Bluetooth coupled device.

10. The system of claim 9 wherein the Bluetooth module is received in an enclosure having an opening through which the wireless signals between the Bluetooth module and the coupled device are more readily passed compared to other portions of the enclosure.

11. The system of claim 10 wherein the enclosure is defined by a housing having an open side or by signal attenuating material surrounding at least a portion of an antenna of the Bluetooth module.

12. The system of claim 2 wherein the display includes touch sensitive areas that permit a user to select from different options each associated with a separate one of the touch sensitive areas, and wherein at least one touch sensitive area may be used to provide two different options to a user with a first option available to permit initial starting of the engine and a second option available after the engine has been started.

13. The system of claim 12 wherein the first option includes an input via which at least part of an access code may be entered, wherein entry of an incorrect access code causes the controller to prevent starting of the engine and wherein the controller permits starting of the engine upon entry of a correct access code, and wherein the second option includes an input via which an engine operating condition can be modified.

14. A device, comprising:
  an engine including a throttle and an electronic throttle control that actuates the throttle and changes the engine speed;
  a tool driven by the engine;
  an input and control module having multiple inputs and a controller, wherein the controller is coupled to the throttle control and is responsive to actuation of the inputs to permit user control of multiple engine operating parameter by user actuation of the inputs, wherein the inputs relate to two or more of changing engine speed, starting the engine, causing the engine to drive the tool, turning on a light, actuating a heater or warmer or stopping engine operation; and a switch having a first state and a second state, and wherein the controller is responsive to the state of the switch to prevent operation of at least one of the one or more inputs if the switch is in the first state and to allow operation of at least one of the one or more inputs if the switch is in the second state.

15. The device of claim 14 which also includes memory with which the controller is communicated and wherein the memory includes information relating to two or more engine operating modes, and the inputs permit a user to select one of the engine operating modes.

16. The system of claim 15 wherein the engine operating modes include at least one of a lower speed engine operating mode and a higher speed engine operating mode, and wherein the memory includes information relating to control of the throttle control for both operating modes, or wherein the engine operating modes include at least one of a more responsive engine operating mode and a less responsive engine operating mode, and wherein the memory includes information relating to control of the throttle control for both operating modes.

17. The system of claim 16 wherein the information relating to control of the throttle control includes information relating to a desired engine speed for multiple operating conditions of both operating modes.

18. The system of claim 17 wherein the multiple operating conditions include a first condition when the tool is not driven by the engine and a second condition when the tool is driven by the engine.

19. The system of claim 17 which also comprises an engine controller and wherein the engine controller provides a signal to the input and control module controller that is indicative of engine speed and wherein the input and control module controller controls the throttle control as a function of the engine speed compared to a desired engine speed for the selected engine operating mode.

20. The system of claim 18 wherein the controller actuates the throttle control to reduce engine speed prior to changing from the first condition to the second condition to reduce a torque impulse when the tool is initially driven by the engine.

21. The system of claim 18 wherein the desired engine speed is different for the first condition than for the second condition.

\* \* \* \* \*